June 25, 1957

J. R. ORELIND ET AL 2,796,717

HILLSIDE HARVESTER THRESHER

Filed Nov. 1, 1954

INVENTORS.
John R. Orelind
Stuart D. Pool
Reynold Barkstrom
Elof K. Karlsson
Paul O. Pippel Atty.

June 25, 1957 J. R. ORELIND ET AL 2,796,717
HILLSIDE HARVESTER THRESHER
Filed Nov. 1, 1954 17 Sheets-Sheet 5

INVENTORS.
John R. Orelind
Stuart D. Pool
Reynold Barkstrom
Elof K. Karlsson
Paul O. Pippel Atty.

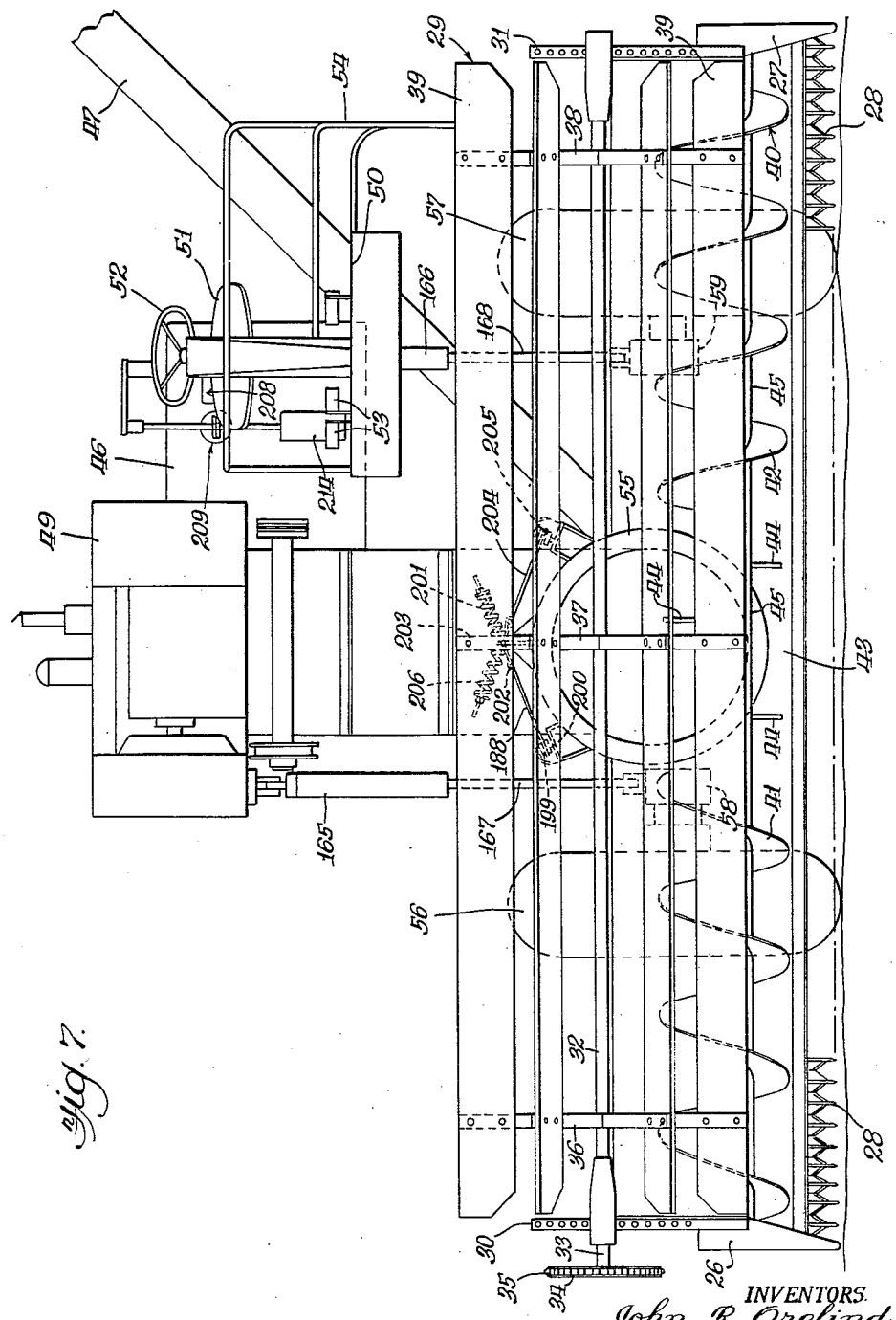

June 25, 1957　　　J. R. ORELIND ET AL　　　2,796,717
HILLSIDE HARVESTER THRESHER
Filed Nov. 1, 1954　　　　　　　　　　　　　　　17 Sheets-Sheet 7
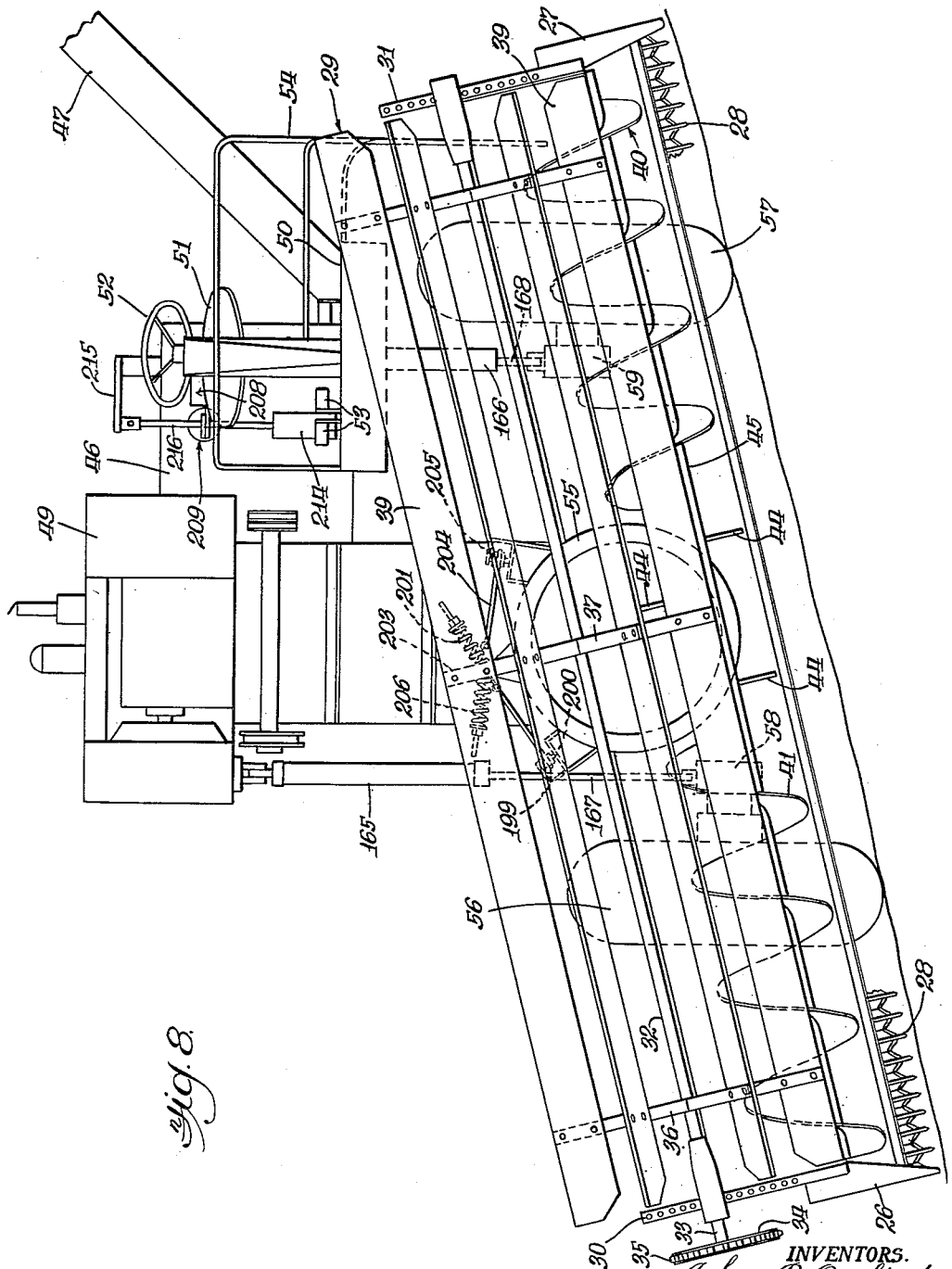

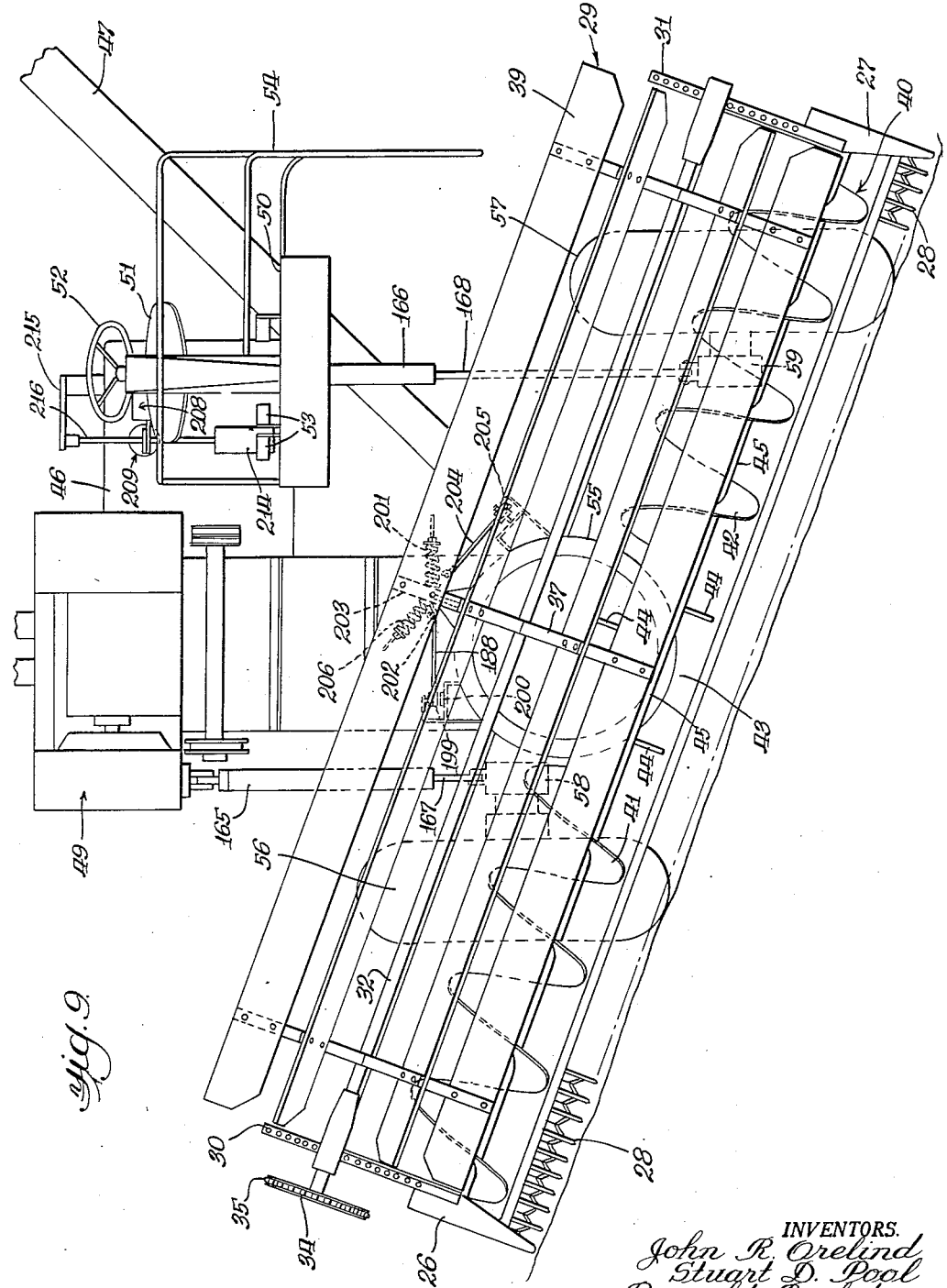

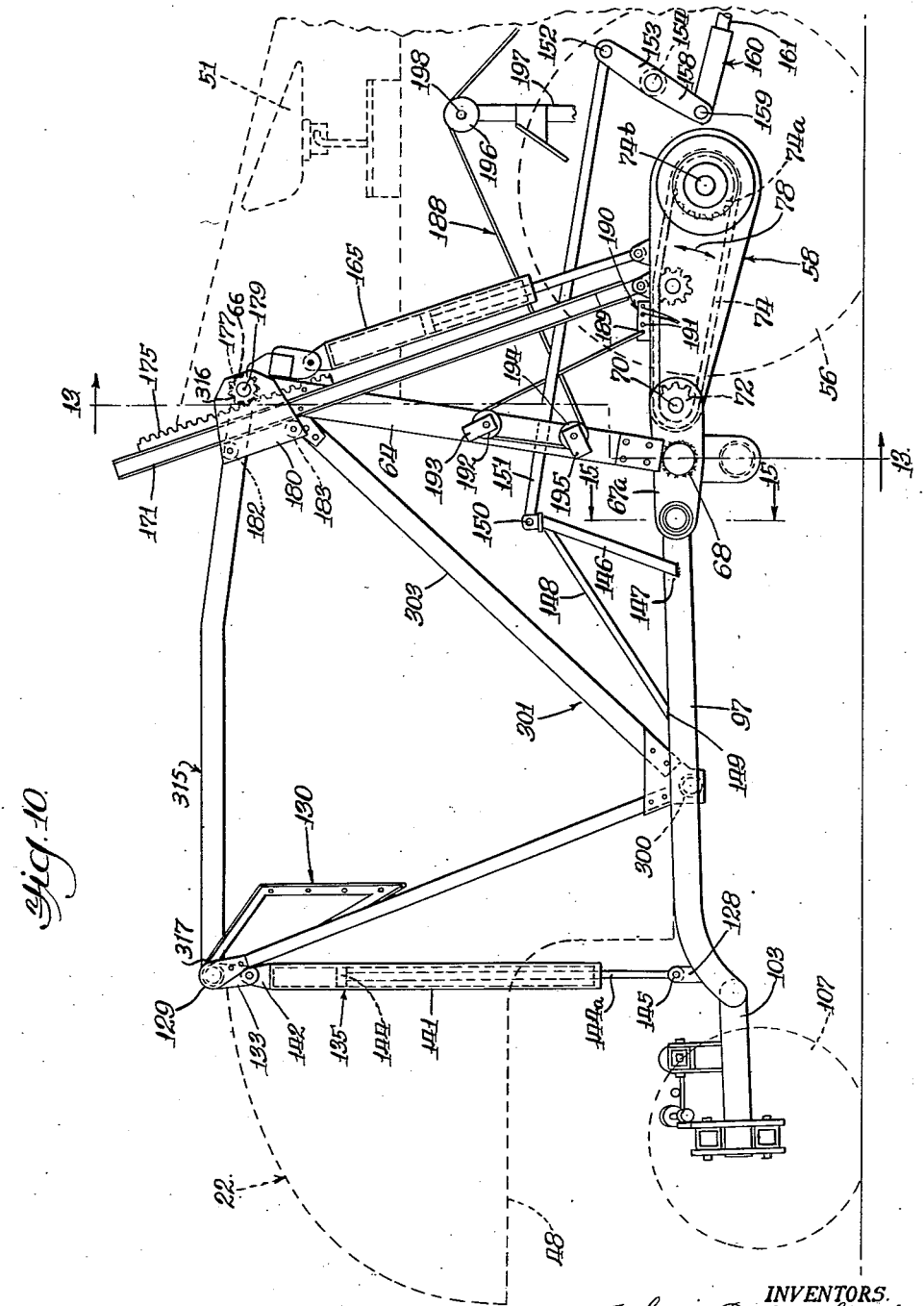

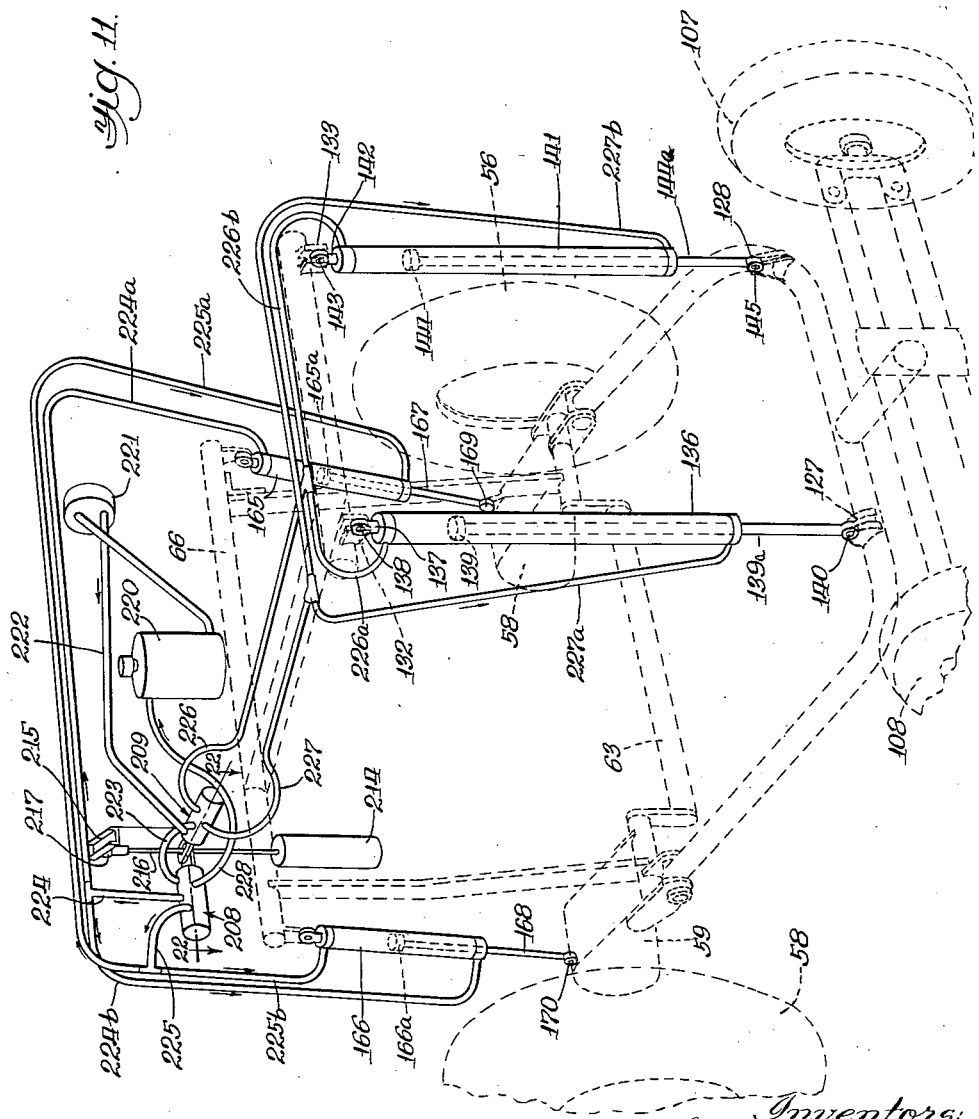

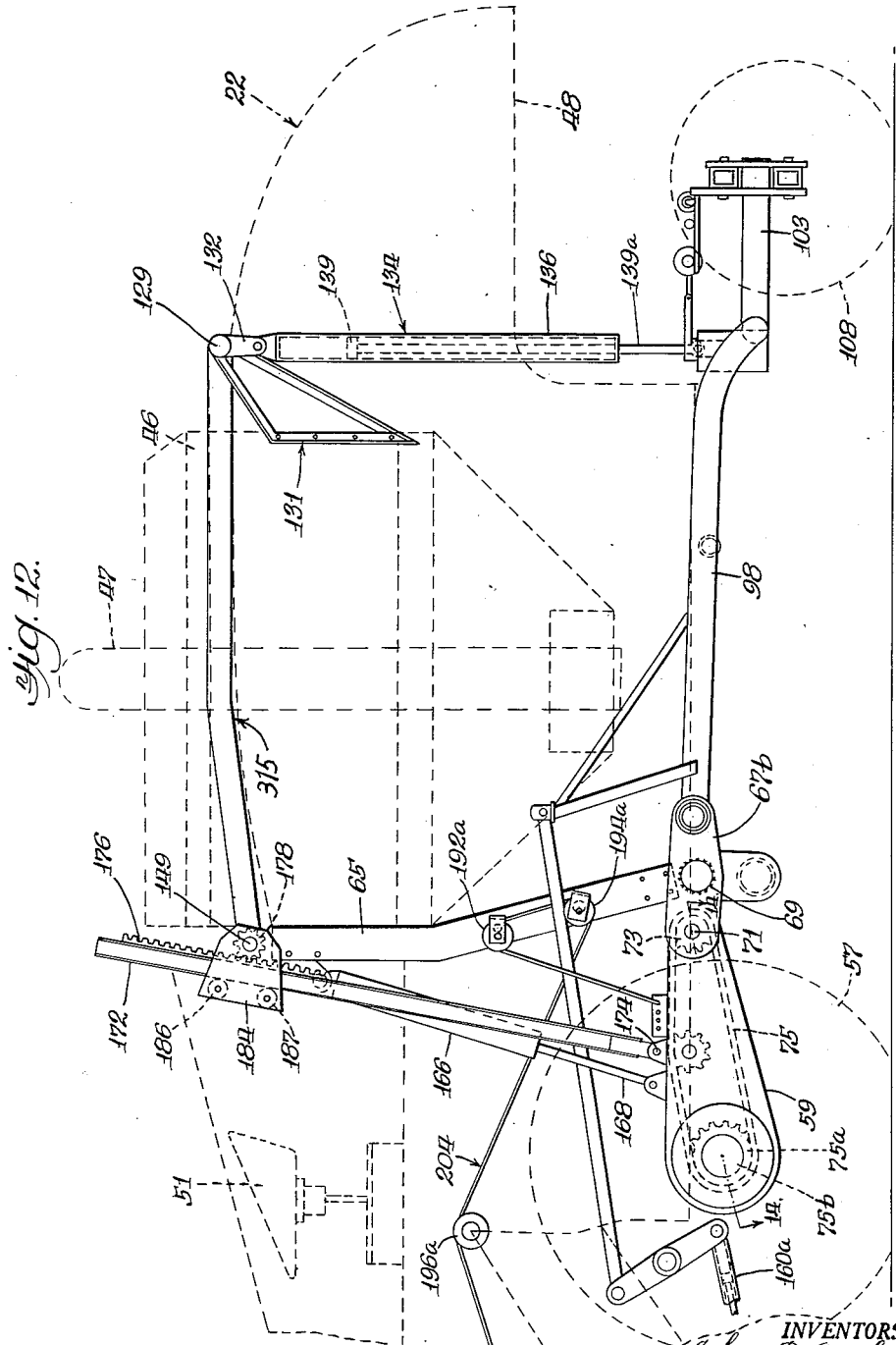

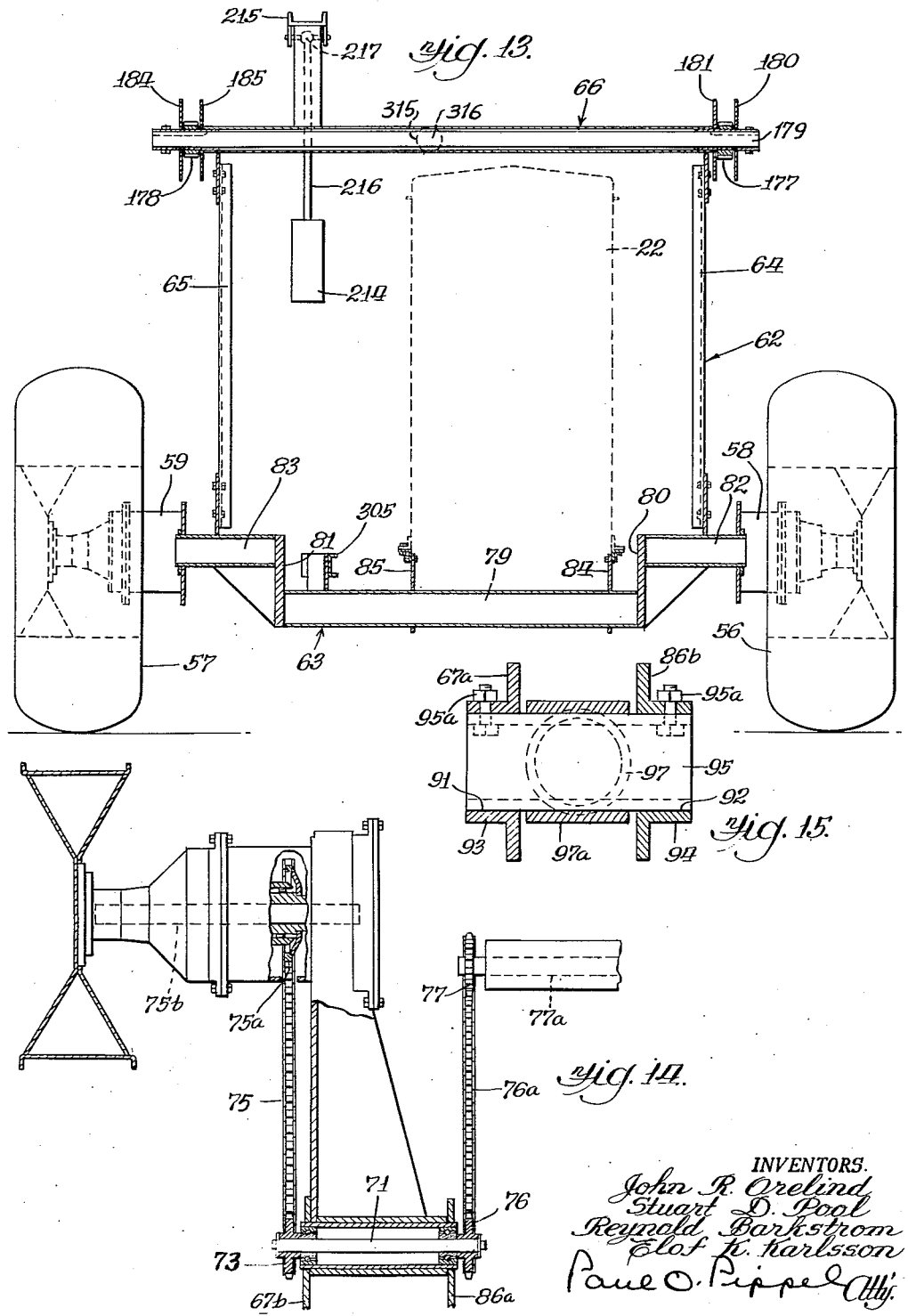

June 25, 1957
J. R. ORELIND ET AL
2,796,717
HILLSIDE HARVESTER THRESHER
Filed Nov. 1, 1954
17 Sheets-Sheet 13
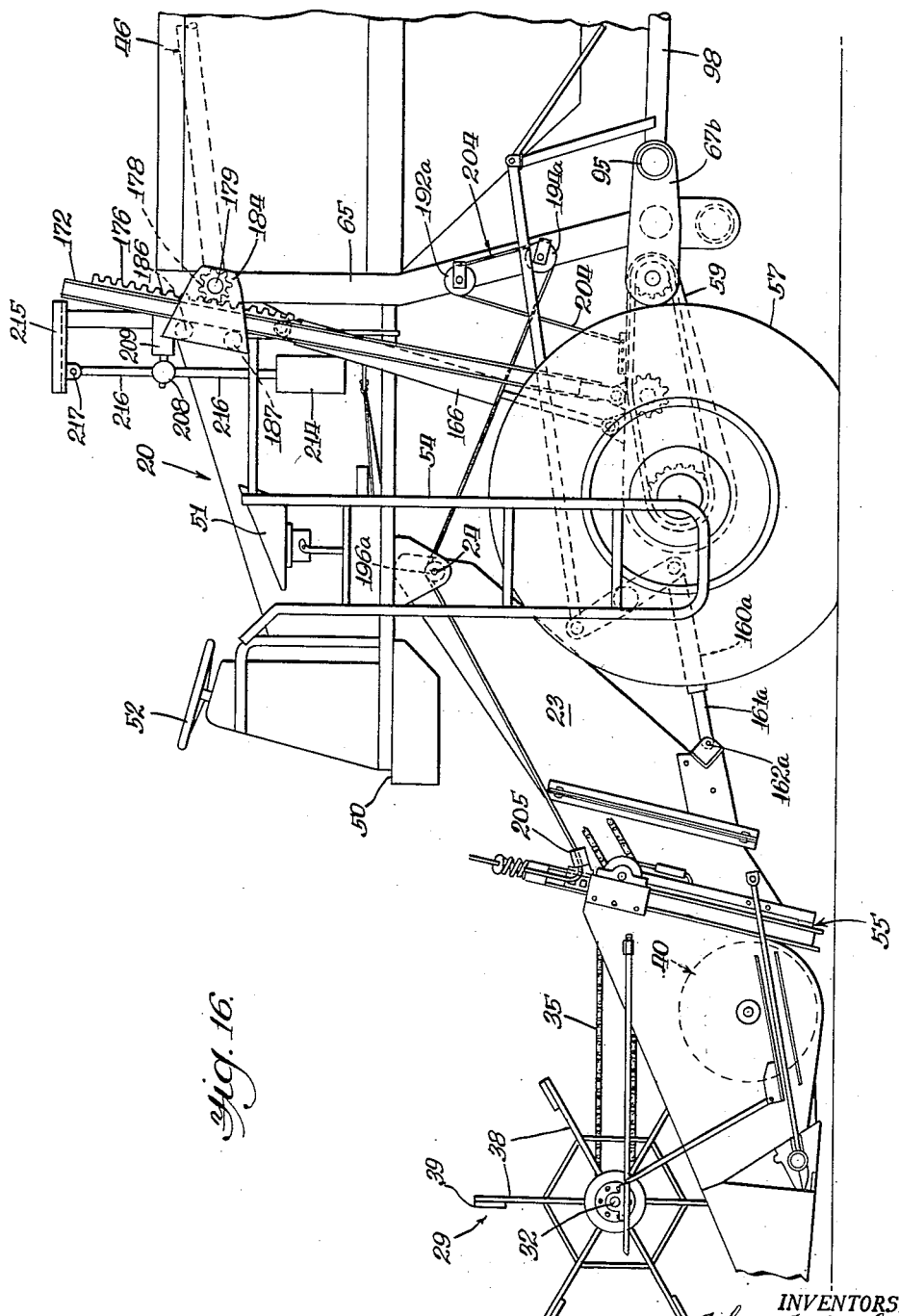
INVENTORS.
John R. Orelind
Stuart D. Pool
Reynold Barkstrom
Olof K. Karlsson
Paul O. Pippel Atty.

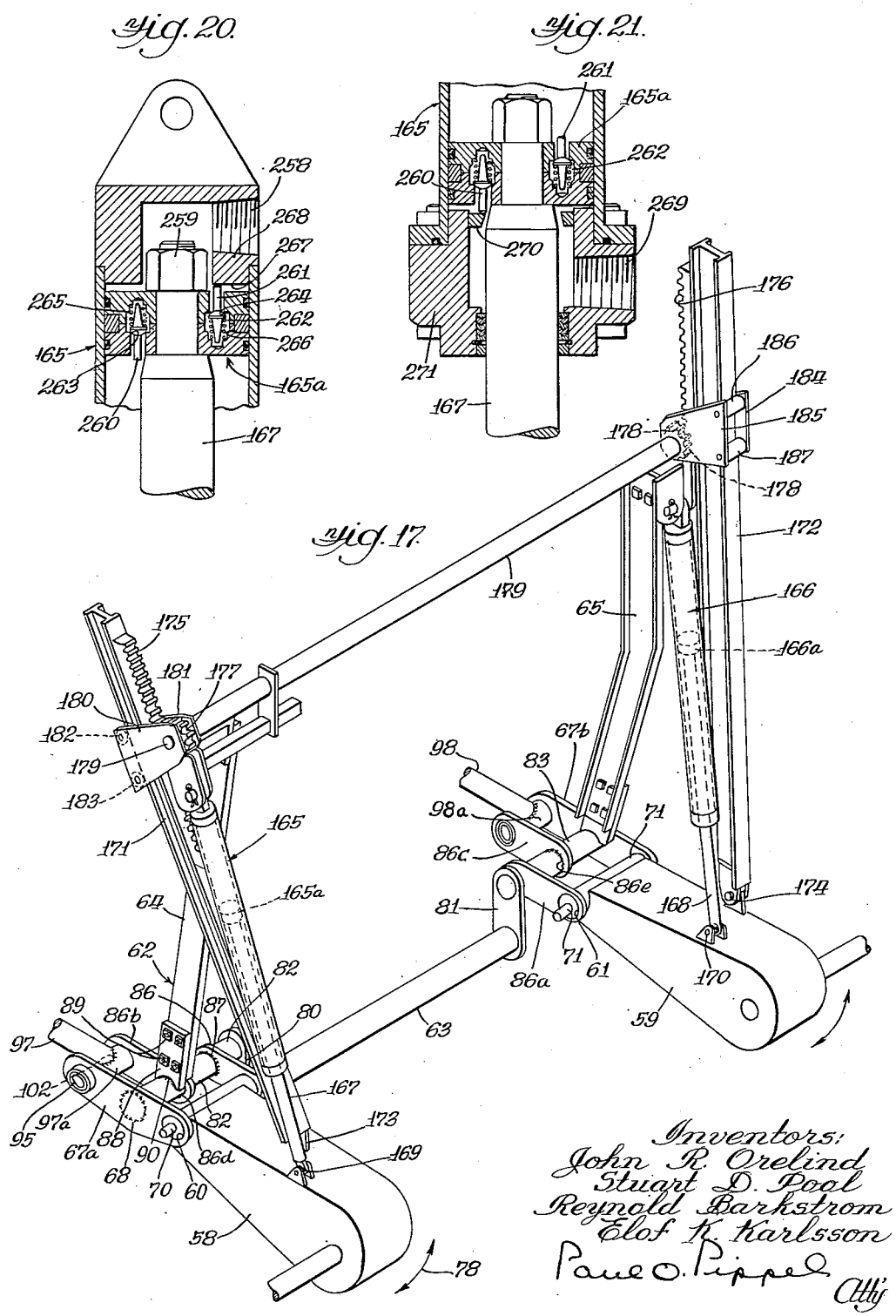

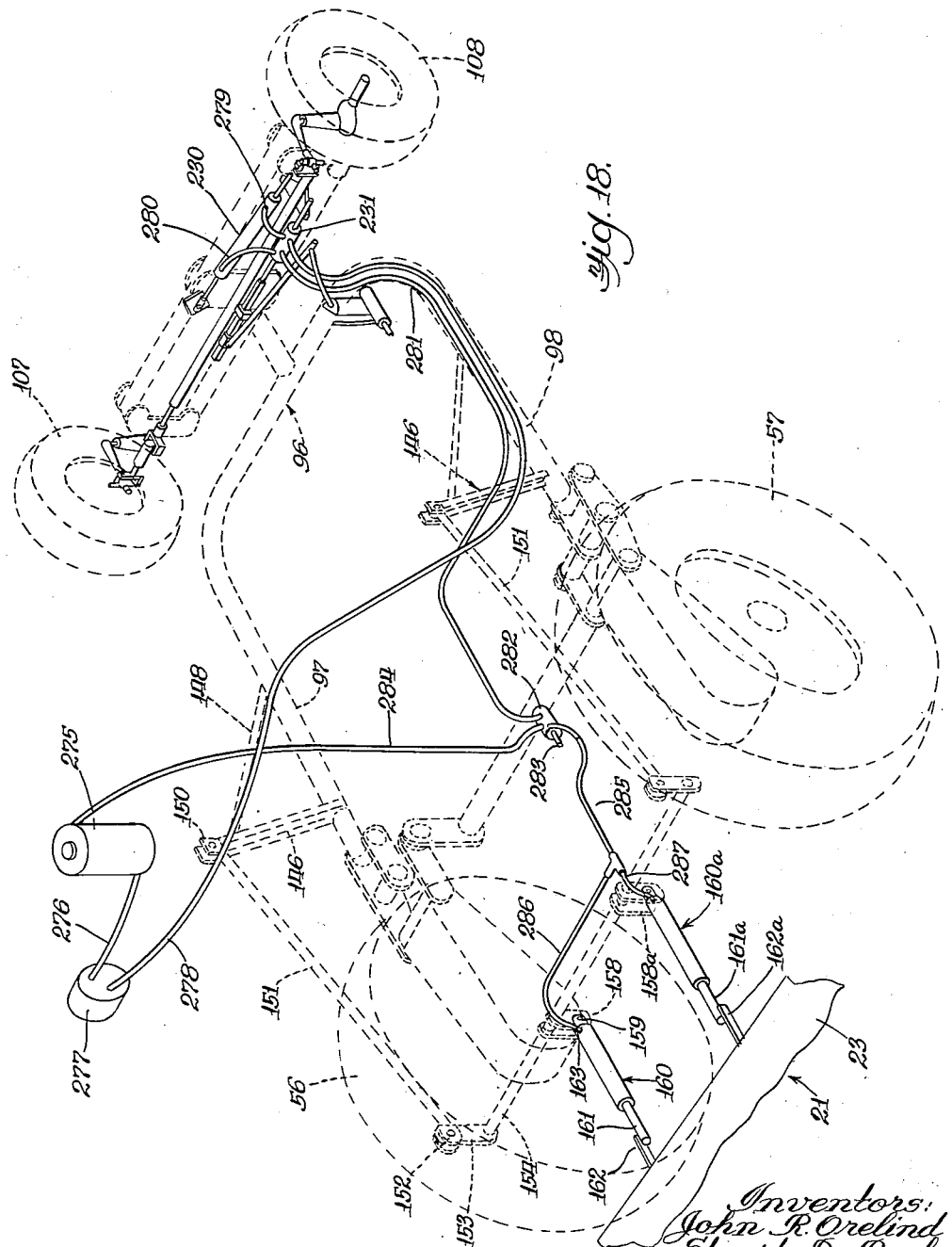

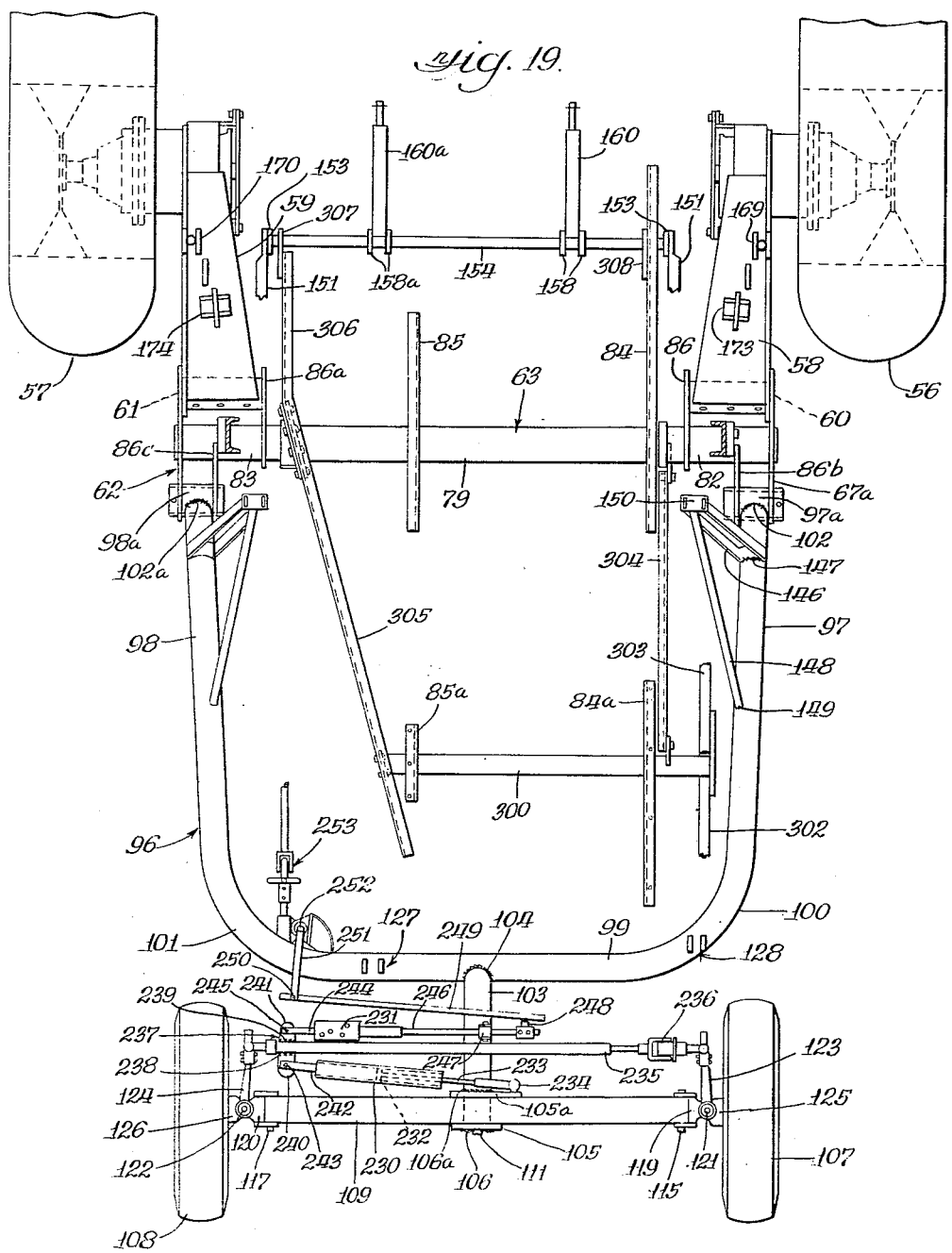

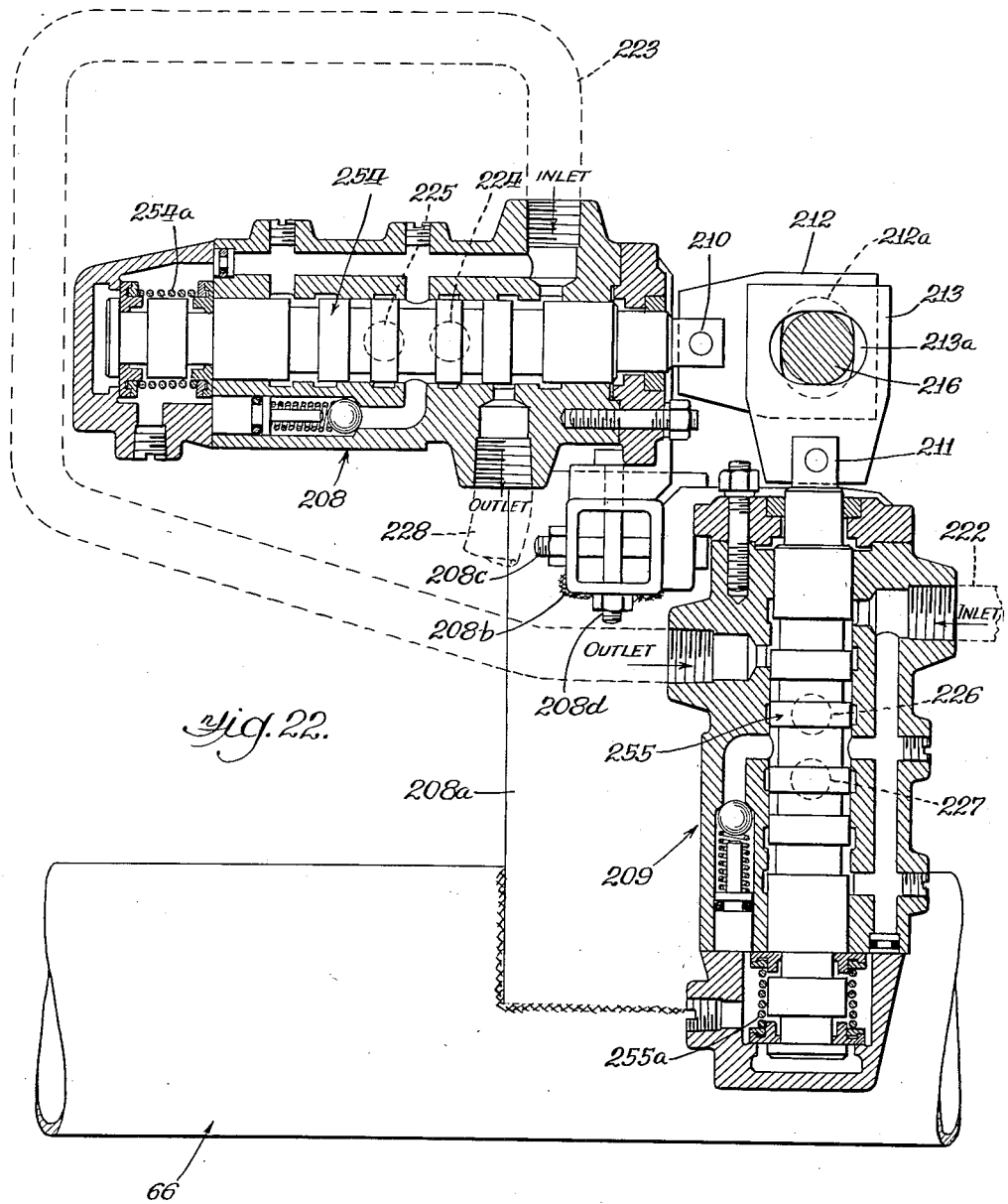

United States Patent Office 2,796,717
Patented June 25, 1957

2,796,717

HILLSIDE HARVESTER THRESHER

John R. Orelind, Wilmette, and Stuart D. Pool, Reynold Barkstrom, and Elof K. Karlsson, Moline, Ill., assignors to International Harvester Company, a corporation of New Jersey Application November 1, 1954, Serial No. 466,112

43 Claims. (Cl. 56—209)

This invention relates to a new and improved hillside harvester thresher.

The harvesting of grain on hillsides has long been an important problem in the agricultural field. Numerous machines have been designed, developed and manufactured in order to facilitate the harvesting of grain growing on hillsides. In recent years the advent of the harvester thresher has posed even more difficult problems inasmuch as it is desirable to now thresh immediately upon harvesting the grain. The first of the harvester threshers were pull type machines wherein a tractor is employed to pull the machine over the hillside terrain whereupon the grain is harvested and then threshed. As a rule in hills of steep grades the type of tractor was usually one of the track-laying type in order to obtain better traction and more firm footing. More recently the trend in harvesting and threshing machines has been to the self-propelled type wherein the harvester thresher has its own source of propulsion. There is now not the problem of separate care for the pulling and trailing implements but rather there is the problem only of caring for the single self-propelled harvester thresher. Such self-propelled harvester threshers must in some manner be leveled for efficient harvesting and threshing. In order to properly harvest the grain growing on a hillside it is essential that the cutter bar of the harvesting machine be inclined parallel to the slope of the hillside, in order to harvest grain with substantially uniform length straw. Further, but for the maintaining of the cutter bar parallel with the ground there would be apt to be quantities of the grain missed and still other quantities of the grain having relatively long straw associated therewith.

In the threshing of grain it is desirable to have a substantially uniform quantity of straw associated with the grain in order to effect uniform and efficient separation of grain from the husks or hulls and the straw. Also it is desirable that the threshing cylinder and the other grain separating mechanisms be maintained substantially level so that quantities of the grain to be threshed and separated do not fall by gravity to one side or the other of the separator and thereupon overwork one side of the mechanism and underwork the other side, in which event the efficiency of the threshing and separating drops off tremendously. Now, with the self-propelled harvester threshers it is necessary to combine the leveling mechanisms with means making the implement stable and safe for hillside operation. Just recently a number of manufacturers of harvesting equipment have employed transverse leveling mechanisms in association with their self-propelled harvester threshers or combines, and this has proved to be an important advancement in the hillside harvester thresher art. This last feature just mentioned is exemplified by the patent to Long 2,654,207.

It is, therefore, a principal object of the present invention to provide a self-propelled harvester thresher with means thereon for fore and aft implement leveling in combination with transverse leveling of the implement, whereupon it is possible for the harvester thresher to be employed on various grades of hillsides and including compound grades.

An important object of this invention is the provision of means in a hillside harvester thresher for automatically leveling the hillside machine in response to changes in the slope of the hillside.

Another and further important object of this invention is to supply a hillside harvester thresher with hydraulic means for accomplishing fore and aft and transverse leveling of the implement.

Another important object of this invention is to equip a hillside combine with hydraulic means for accomplishing fore and aft and transverse leveling and including control means for the hydraulic means operable automatically in response to changes in level of the combine.

Another and still further important object of this invention is to provide a hillside harvester thresher having an articulated frame wherein the various component parts of the implement may assume any shape necessary to conform to various hillside slopes.

A still further important object of this invention is the provision of means in a self-propelled hillside combine wherein an articulated frame provides opposite upward and downward swinging movement of the traction wheels, up and down movement of the rearwardly disposed steerable wheels, an upwardly and downwardly swinging harvesting platform at the forward end of the machine, and rigid frame means for carrying the threshing and separating elements of this machine in a manner to prevent distortion and/or damage to any of the parts thereof.

Another and still further important object of this invention is to provide a rigid auxiliary main frame for a hillside harvester thresher attachment wherein portions to the front and rear of the machine are hingedly mounted with respect to the rigid portion and the centrally disposed traction wheels are carried on swingable arms on the rigid frame whereby the implement may be leveled both fore and aft and transversely.

A still further important object of this invention is to provide a hillside harvester thresher of the self-propelled type wherein the platform or harvesting portion of the implement may be angularly varied about a longitudinal axis commensurate with the downward and upward swinging movement of the centrally disposed large traction wheels so that the angular disposition of the platform and wheels is substantially the same.

Still another important object of this invention is to supply a relatively horizontally disposed U-shaped frame member with the forward ends of the U hingedly mounted on a fixed or rigid frame member, and having steerable wheels mounted at the closed rearward end of the U-shaped frame member and the device carrying a hillside harvester thresher, whereupon vertical swinging movement of the generally horizontally disposed U-shaped frame member causes compensatory leveling of the implement for longitudinal slopes on the hillside over which the machine of this invention is run.

A further important object of this invention is to equip a self-propelled hillside harvester thresher with a generally articulated tubular frame structure wherein there are torque resistent members disposed both transversely and longitudinally with respect to the implement carried thereby.

Other and further important objects and advantages will become apparent from the disclosures in the following specification and accompanying drawings.

In the drawings:

Figure 5 is a rear elevational view similar to Figure 4 in which the implement is traversing a side hill in a manner to cause the traction and steerable wheels to be inclined from a horizontal level to a parallel position with respect to the side hill incline;

Figure 6 is a view of the end of the machine similar to Figures 4 and 5 but with the machine positioned on a side hill inclined in the opposite direction from the hill shown in Figure 5;

Figure 7 is an enlarged front elevational view showing the self-propelled harvester thresher of this invention generally level;

Figure 8 is another front elevational view similar to the view of Figure 7 with the device positioned on a side hill wherein the harvesting platform and the traction wheels have been shifted from a horizontal position to an angular position corresponding in degree to the degree of slope of the side hill and leaving the threshing and separating mechanism generally level;

Figure 9 is a front elevational view similar to the device as shown in Figures 7 and 8 wherein the machine is located on a hill of opposite slope from that of Figure 8 and the harvesting platform and traction wheels are inclined in an opposite direction to lie parallel with the slope of the hill;

Figure 10 is an enlarged side elevational view of a part of the self-propelled harvester thresher of this invention taken from the side opposite the device as shown in Figures 1, 2 and 3 in order to disclose the carrying frame structure more fully;

Figure 11 is an enlarged perspective view of the self-propelled combine of this invention showing all of the implement in dashed lines with the hydraulic levelling system in full lines in such a manner as to clearly disclose the relative positioning of all of the hydraulic elements and more particularly their environment on the entire combine.

Figure 12 is an enlarged side elevational view of a portion of the self-propelled hillside harvester thresher;

Figure 13 is a sectional view taken on the line 13—13 of Figure 10;

Figure 14 is an enlarged sectional view taken on the line 14—14 of Figure 10; and Figure 15 is an enlarged sectional view taken on the line 15—15 of Figure 10;

Figure 16 is an enlarged side elevational view of a portion of the implement showing the interconnecting linkage between the platform and the steerable wheel carrying frame.

Figure 17 is an enlarged perspective view of the wheel carrying arms and showing more particularly the mechanism for controlling the angular level of the wheel carrying arms;

Figure 18 is an enlarged perspective view detail of the hydraulic system operating means for the steering and platform raising of the device of this invention;

Figure 19 is an enlarged top plan view of the frame supporting structure of the hillside harvester thresher of this invention;

Figure 20 is an enlarged sectional view detail of the upper end of one of the cylinders as used in the angular adjustment of the wheel carrying arms;

Figure 21 is an enlarged sectional view detail of the lower end of the cylinder as shown in Figure 20; and Figure 22 is an enlarged sectional view taken on the line 22—22 of Figure 11 showing the control valves used to actuate the two-way tilting of the harvester thresher.

As shown in the drawings:

Figure 1:
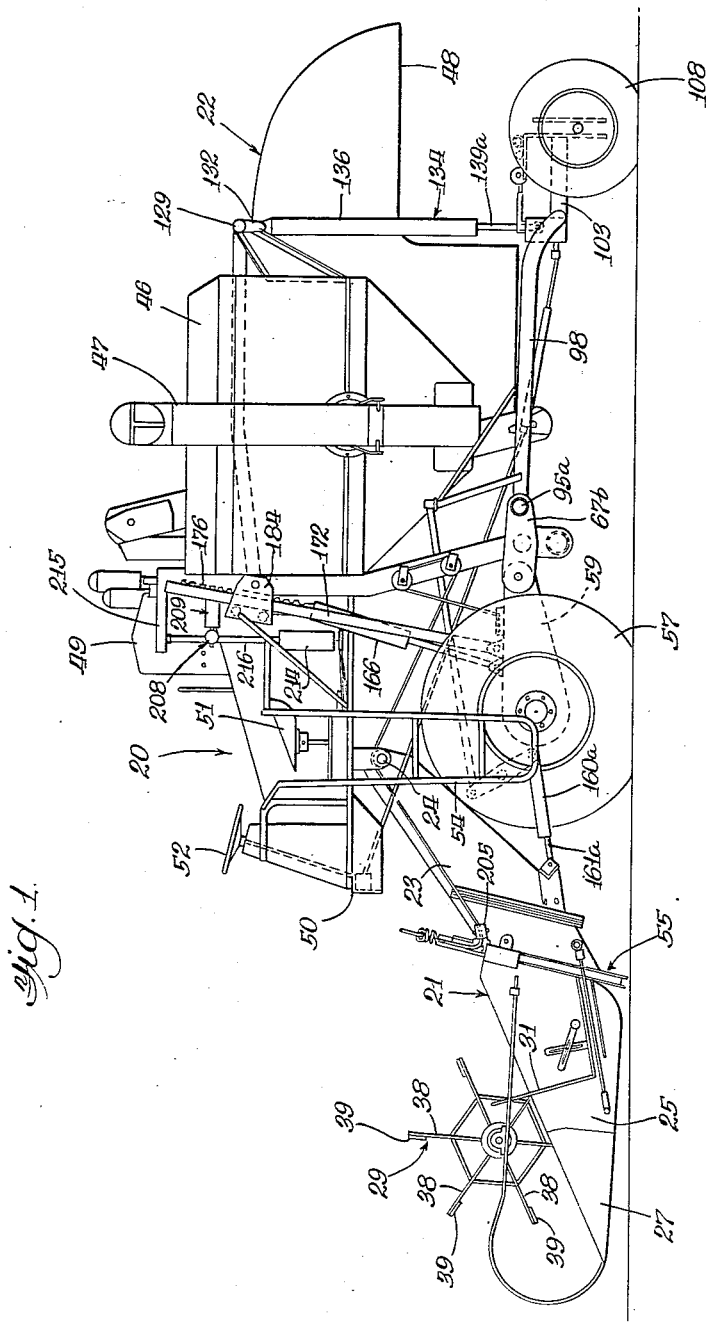
Figure 1 is a side elevational view of the hillside harvester thresher of this invention disposed on level terrain.
Figure 2:
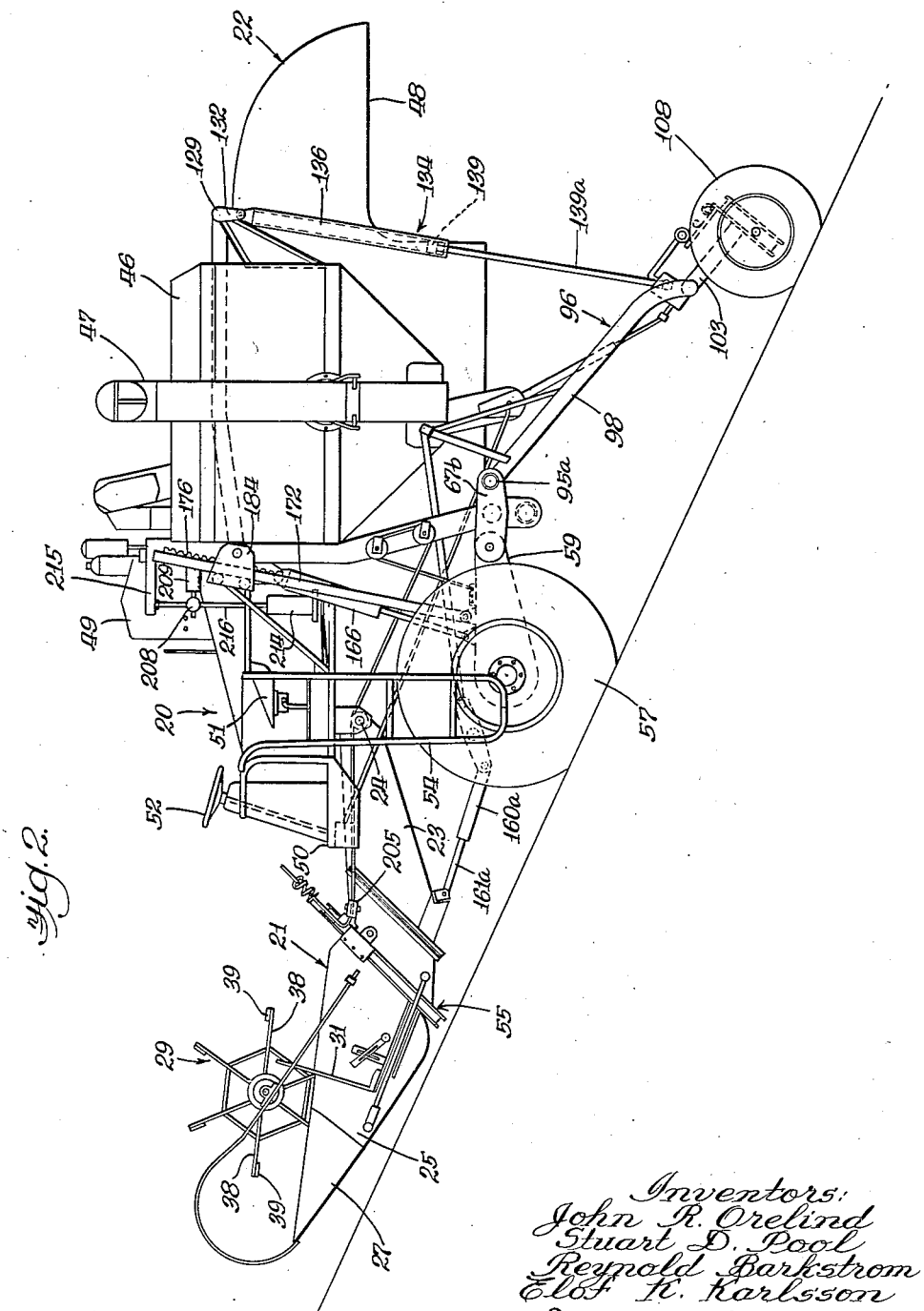
Figure 2 is a side elevational view of the self-propelled combine as shown in Figure 1 with the machine disposed on an upwardly sloping hill.
Figure 3:
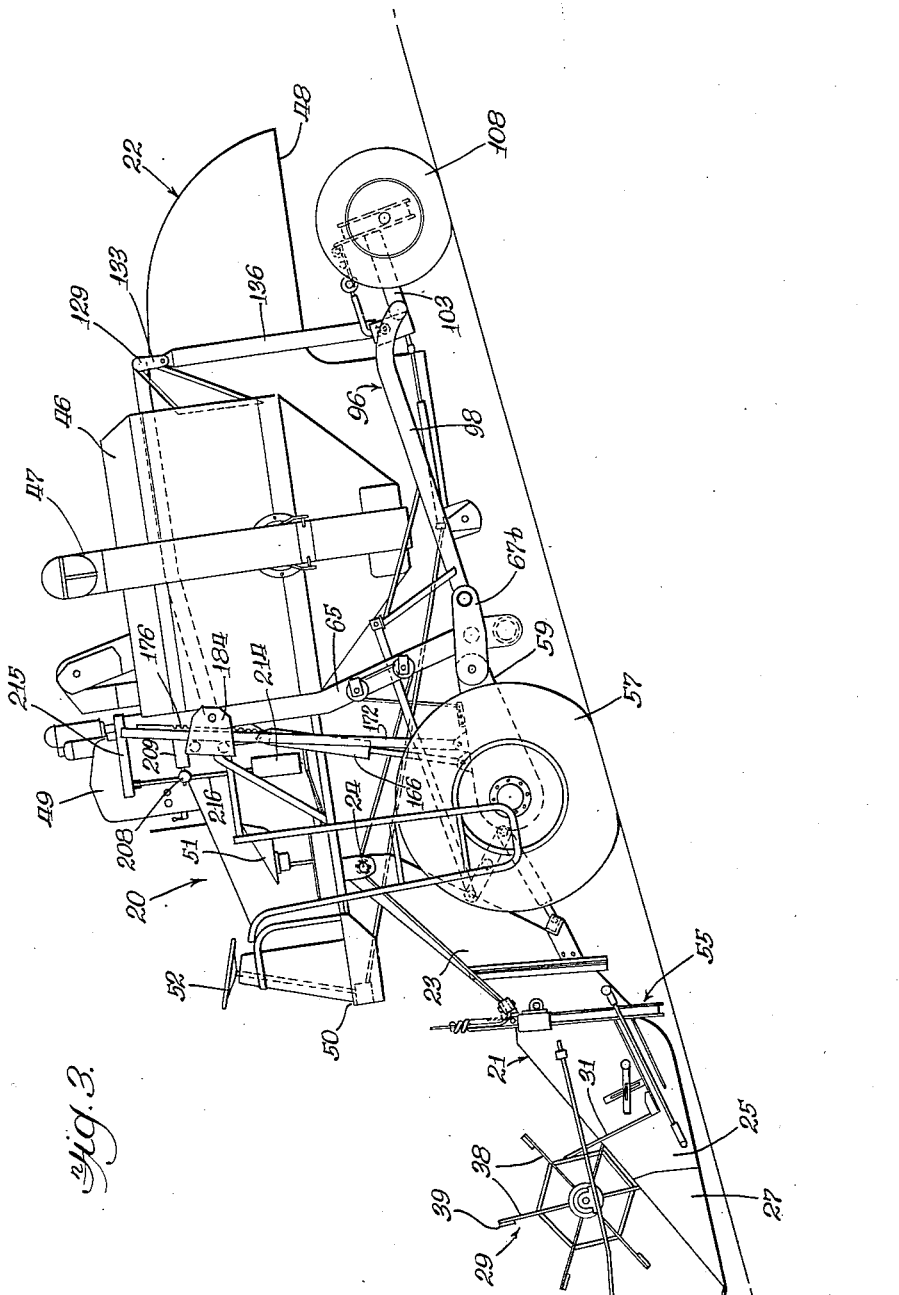
Figure 3 is a view similar to Figures 1 and 2 wherein the machine is traveling down a hill.
Figure 4:
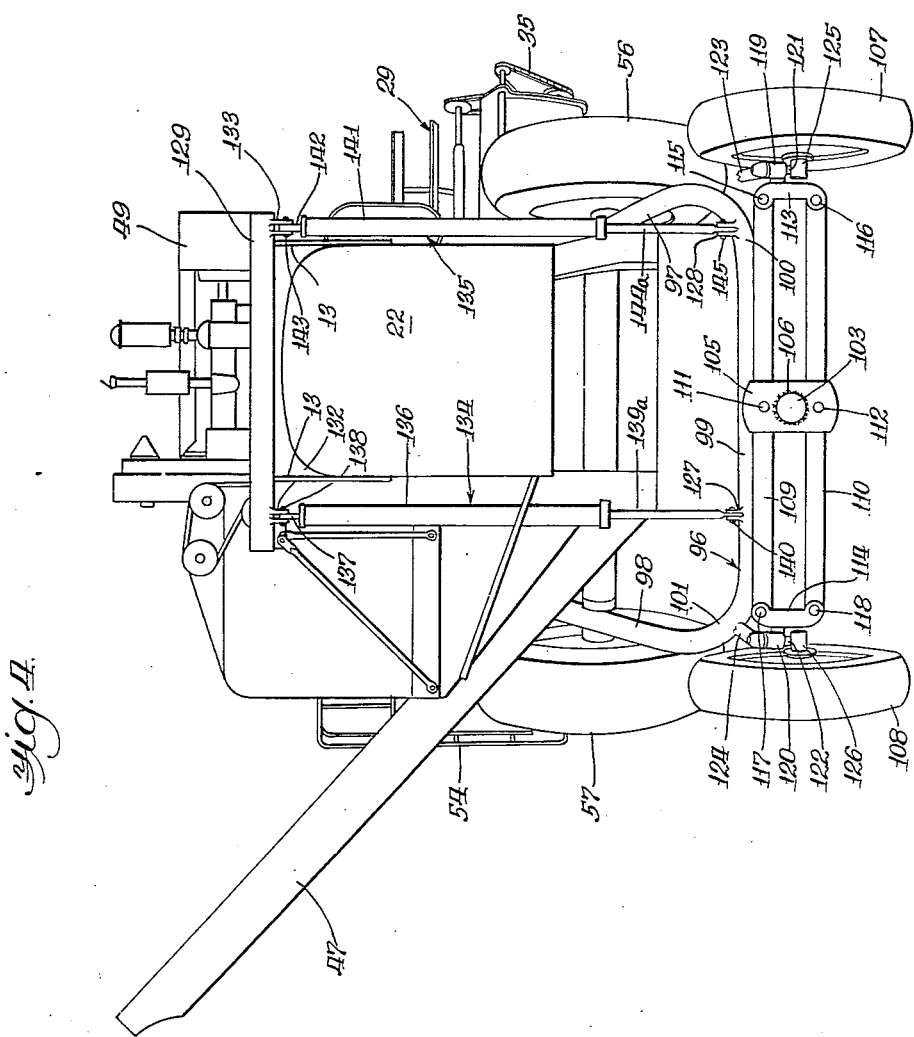
Figure 4 is an enlarged rear elevational view of the self-propelled harvester thresher of Figures 1 to 3 inclusive, wherein the implement is positioned on generally level ground.

The reference numeral 20 indicates generally a self-propelled hillside harvester-thresher. The term "harvester thresher" is synonymous with the word "combine" and it should be understood that the use of these terms whenever they occur throughout this specification means the same thing. The harvester thresher includes a harvesting portion 21 and a thresher or separating mechanism 22. The harvester portion 21 includes a feeder housing 23 which is pivotally attached at 24 to the separator housing 22. The harvesting portion 21 also includes a relatively wide platform 25 which is adapted to pass closely over the ground and receive the grain. The platform 25 includes spaced end dividers 26 and 27 and an intermediately disposed sickle bar 28 extending across the full forward edge thereof. The platform also is provided with a grain reel 29 journally carried on generally upright standards 30 and 31 located at opposite ends of the platform and closely associated with the end divider points 26 and 27 respectively. The reel 29 is provided with a central shaft 32 which has an end extension 33 carrying a sprocket 34 for receiving rotational drive through the medium of a chain or the like 35. The reel 29 has radially disposed spider members 36, 37 and 38 which carry at their outer ends, reel bats 39. These plurality of bats are arranged and constructed to sweep downwardly on the standing grain and cause that grain to be delivered rearwardly into the forwardly extending sickle bar 28 whereupon the grain is severed at its lower end and deposited rearwardly onto the platform 25. The platform 25 has a transversely disposed auger conveyor 40 extending across the substantially flat surface thereof with oppositely pitched spiral flights 41 and 42 adapted to deliver material centrally of the platform adjacent the rearwardly and upwardly inclined feeder housing 23. This central portion of the platform designated by numeral 43 is arranged to be swept clean of the grain received from the endwise moving screw flight 41 and 42 and also that grain which falls directly thereon by means of retractable fingers 44 extending outwardly from the core 45 of the transverse auger 40. The transverse auger 40 on the platform 25 is of generally standard construction and is used by most of the manufacturers of farm machinery. Although the construction of the auger conveyor and the platform mechanism has been described more or less in detail it does not form a direct part of the present invention other than to place the hillside harvester thresher of this invention in the environment in which it is actually used.

Following the harvesting and gathering of grain by the harvesting portion 21 of this machine the cut grain is moved centrally of the wide platform 25 and thereupon moved upwardly and rearwardly by conveyor means (not shown) in the centrally disposed feeder housing 23. At the upper end of the feeder housing the grain is delivered to a threshing mechanism (not shown) and thereupon the grain is threshed and subsequently separated in the housing 22 provided therefor. Immediately following grain threshing and separation the clean grain is deposited in a grain-receiving tank 46. The grain in the tank may be subsequently discharged through an elevator type of conveyor means 47 to trailing wagons or bins as desired. The trash material is discharged outwardly and rearwardly through the back end 48 of the separator housing 22. The various mechanisms of the self-propelled hillside harvester thresher as well as the propulsion of the device is accomplished by means of an engine 49 disposed across the top of the forward end of the separator housing 22. An operator's platform 50 is mounted at a position adjacent the forward end of the separator housing 22 and just rearwardly of the harvesting portion 21 of the machine. The operator's platform 50 includes an operator's seat 51 which is in close proximity with a steering wheel 52 and operating foot pedals or the like 53 which control the operation and movement of this implement. Mounting stairs in the form of a ladder 54 are suspended from the operator's platform 50 and enable the operator to mount the implement.

Up to this point the harvester thresher thus described is the same as most self-propelled harvester threshers now on the market. In the present invention we are concerned with means for converting the ordinary harvester thresher into one for use on hillsides. One of the first distinctions which should be mentioned is the mounting of the harvester platform 25 on a pivot or turntable 55 positioned between the lower forward end of the feeder housing 23 and the back central portion of the platform 25. It should thus be apparent that means are provided in this machine for permitting the platform 25 to rotate about the pivot ring 55 on the feeder housing 23 so the platform 25 may assume any inclination and thus traverse a field of standing grain on a hillside and cut uniformly length grain by reason of the implement being capable of having its platform 25 positioned parallel with respect to the inclined slope over which the machine is operating. The details of the construction of the substantially vertically disposed turntable 55 rotating on a horizontal axis have not been included in this application inasmuch as it is only incidental to the present invention. However, the tilting of the platform by cable means will be subsequently described in this application.

It will be noted that there has not yet been any description of the carriage or ground-engaging wheels which are necessary to support the self-propelled hillside combine of this invention. The reason for this is that the wheels form an integral part of the articulated frame supporting structure or frame part constituting the means for carrying the implement and the means for adjusting the implement to any slope on which the machine may be operated. The large traction wheels are shown in Figure 7 at 56 and 57.

Because the implement must adapt itself to various hillside slopes it is a requirement that the traction wheels 56 and 57 be vertically adjustable relative to each other so that the thresher and separator housing 22 may be maintained horizontally level regardless of the slope on which the implement is operating. Obviously, on level terrain the wheels will be level with each other and the implement positioned between the traction wheels will also be level. In order to adapt the machine for use on a hillside it is necessary that one traction wheel rise an amount equal and opposite to the amount of fall of the other traction wheel. In other words the traction wheels are mounted on transversely spaced apart hinged arms 58 and 59 as shown respectively in Figures 10 and 1. These arms constitute the forward portion of the frame supporting structure mentioned above. The arms 58 and 59 of the traction wheels 56 and 57 are hingedly mounted at 60 and 61 respectively on a main or rigid central frame structure 62. The part 62 is a centrally disposed portion of the frame supporting structure of this implement. This rigid frame structure 62 is substantially rectangular in shape and extends around the peripheral surface of the thresher separator housing 22. The lower side of the rectangular frame structure 62 comprises a member 63. This member 63 passes beneath the separator housing 22 and constitutes the means for carrying the self-propelled harvester thresher of this invention. As best shown in Figures 13 and 17 the sides of the rectangular frame structure 62 are shown at 64 and 65. These side members 64 and 65 flank the outside of the separator housing 22 and extend from a position adjacent the underside of the body to a position over the top of the body whereupon the rectangular frame structure is completed by means of a cross tubular member 66.

The generally vertically disposed rectangular frame structure 62 forms the principal support for the harvester thresher of this invention. As best shown in Figure 17, the frame structure 62, in addition to being rectangular in shape, has longitudinally extending side plates 67a and 67b. The plates 67a and 67b are welded respectively at 68 and 69 to the main rectangular frame structure 62, as shown in Figures 10 and 12. It is thus obvious that the plates 67a and 67b become, and are, an integral part of the frame structure 62. It is to these plates 67a and 67b to which the traction-wheel supporting arms 58 and 59 are pivotally attached. These pivotal attachments are best shown in Figures 1, 10, 12 and 17. Shafts 70 and 71 are journally mounted in the plates 67a and 67b to receive the arms 58 and 59 and thus constitute the hinge means 60 and 61. These shafts 70 and 71 are in the nature of jack shafts, in order to transmit drive to the traction wheels. As shown in Figures 10 and 12, sprockets 72 and 73 are affixed to the shafts 70 and 71, respectively; and as further shown drive from these sprockets is imparted by means of chains 74 and 75 forwardly to sprockets 74a and 75a on the traction wheel shafts 74b and 75b respectively. Input drive to the jack shafts 70 and 71 is accomplished by means of sprockets 76 (only one shown) as illustrated in association with shaft 71 in Figure 14. A chain 76a mounted on the sprocket 76 delivers drive from a sprocket 77. The sprocket 77 is fastened to a drive shaft 77a projecting out from the side of the separator housing 22. It will thus be apparent that the rods, or shafts, 70 and 71 perform the dual function of hinge axes for the wheel-carrying arms 58 and 59, and as jack shafts in order to effect drive to the traction wheels. The fact that the jack shaft is concentric with the hinge insures that the chains 74 and 75 will be constant length in their driving of the traction wheels 56 and 57. The wheel-supporting arms 58 and 59 swing upwardly and downwardly, as indicated by the arrow 78 as shown in Figures 10 and 17, about their respective hinges.

As best shown in Figure 13, the lower frame member 63 of the rigid frame structure 62 consists of a transversely disposed tubular member 79 and upwardly extending members 80 and 81 at each end of the central tubular portion 79. Further, the member 63 includes laterally outwardly extending end portions 82 and 83. The end portions 82 and 83 are in axial alignment with one another, but spaced apart on each side of the separator housing 22. Further, the end portions 82 and 83 are in parallel, but offset, relationship from the lower central tubular member 79. The forward portion of the separator housing 22 is carried on and over the central tubular member 79 by means of brackets 84 and 85. The rearward portion of the separator housing is mounted on similar brackets 84a and 85a spaced rearwardly of the brackets 84 and 85. The brackets 84a and 85a are in turn carried on a cross frame member 300. The frame member 300 is supported by a truss 301 comprising a downwardly and forwardly inclined member 302 from the torque tube 129 and a rearwardly and downwardly inclined member 303 from the torque tube 66. The frame is further supplemented by a longitudinally extending member 304 on one side of the machine between the cross members 79 and 300. On the other side a frame member 305 joins the cross member 300 and projects forwardly to the cross member 79. A forward extension 306 of the member 305 is arranged to carry a bearing support 307 for mechanism to be subsequently described. The offset of the member 79 with the spaced end portions 82 and 83 permits greater tilting of the implement without contacting the ground over which the implement is driven.

As best shown in Figure 17, an additional plate member 86 is weldably attached at 87 to the end portion 82 of the under-frame member 63. This plate member 86 is disposed parallel to, but spaced from, the plate 67a, and is generally spaced inwardly toward the side of the separator housing 22. The upright frame member 64 of the generally rectangularly shaped frame structure 62 is shown as having a downwardly extending arm, or bracket, 88. The bracket 88 is bolted at 89 to the frame member 64. The bracket 88 extends downwardly and is weldably attached, as at 90, to the end portion 82 of the cross member 63. The upright member 65, which is disposed on the opposite side of the implement, is constructed in the same manner as the upright 64; and thus, the uprights 64 and 65 constitute an integral and rigid part with the frame structure 62. The plate member 86 is not as long as the plate 67a, and does not project rearwardly further than the position of the end portion 82 of the lower cross member 63. Thus, the hinge attachment of the wheel-supporting arm 58 is made jointly to the plates 67a and 86. Similarly the other side of the machine has a foreshortened plate 86a, similar to the plate 86, and lying parallel to the plate 67b. The spaced plates 67b and 86a thus hingedly carry the wheel carrying arm 59.

As best shown in Figure 17 the center stationary portions of the frame structure also have intermediately disposed plates 86b and 86c which are respectively positioned between and parallel to the plates 67a and 86 on the one side and the plates 67b and 86a on the other side. The plates 86b and 86c are welded respectively at 86d and 86e on the end tubes 82 and 83 of the bottom 63 of the rectangular frame. The plates thereupon extend rearwardly a distance equal to the rearward extension of the plates 67a and 67b. Figure 15, of the drawing is a sectional view taken through the frame structure 62 and discloses that the plates 67a and 86b have outwardly struck openings 91 and 92, respectively. These openings are provided with annular flanges 93 and 94 which form bearing supports for a cross-tubular member 95. The cross-tubular member 95 is fastened within the openings 91 and 92 by bolts 95a.

A U-shaped generally longitudinally extending frame member 96 is shown in Figure 19 and is provided with forwardly extending leg or arm members 97 and 98 which are generally parallel one to the other while the perpendicularly disposed end connecting member at the bottom of the U, is shown at 99. The member 96 is the rear longitudinally disposed portion of the frame supporting structure of this implement. The portions of the U-frame 96 which join the side arms 97 and 98 with the end or U portion of the member 99 constitute upwardly and forwardly curved and inclined connecting portions 100 and 101 on opposite sides of the machine. The forward end of the U-shaped arm 97 is welded as at 102 to cross tubular member 97a. The forward end of the U arm 98 is provided with a similar cross tubular member 98a welded at 102a for hinge mounting at the other side of the implement in the spaced apart plates 67b and 86c. In any event each of the U arms 97 and 98 are provided with T heads 97a and 98a which permit the vertical hinging of the U member 96 on and around the fixed tube member 95.

As best shown in Figure 19 the rearward end 99 of the U frame is provided with a rearwardly extending tubular member 103 which is welded thereto at 104. The tubular member 103 is positioned substantially perpendicular to the base member 99 of the U frame 96. Longitudinally spaced apart, vertically disposed plate members 105 and 105a are welded as shown at 106 and 106a to the tubular member 103. Steerable wheels 107 and 108 are carried on this rearwardly extending frame structure 103, 105 and 105a. It will thus be apparent that inasmuch as the steerable wheels 107 and 108 are mounted as a part of the hinged frame structure 96 that the wheels 107 and 108 also are hingedly mounted with respect to the separator body 22.

Parallel links 109 and 110 are hingedly mounted on vertically spaced apart pins 111 and 112 between the vertically disposed plates 105 and 105a which as previously stated constitute an integral part of the hinged frame structure 96. The parallel links 109 and 110 are disposed across the rearward end of the implement and are joined at their outer ends by means of parallel links 113 and 114 which are hingedly attached to the parallel links 109 and 110 at 115 and 116 and 117 and 118 respectively as shown in Figures 4, 5, 6 and 19. The parallel links 113 and 114 remain generally vertically disposed throughout all variations of relative positioning of the machine elements in traversing hillsides whether the hillside be a single or compound slope. Each of the links 113 and 114 is provided with laterally outwardly extending projections 119 and 120 respectively. The outwardly extending projections 119 and 120 which are fixedly attached to the parallel link arms 113 and 114 are provided with vertically extending journal sockets which are adapted respectively to receive vertical hinge pins or the like 121 and 122. These pins have forwardly disposed bell-crank arms 123 and 124 to which are attached the steering linkage for effecting rotation or swinging movement of the dirigible wheels 107 and 108 to effect a turning of the implement. The lower ends of the pins 121 and 122 are provided with laterally outwardly extending bell crank arms 125 and 126 on which are directly mounted the dirigible wheels 107 and 108. Thus the hinge pins 121 and 122 with their integral bell crank arms 123 and 125 and 124 and 126, respectively, perform the function of steering the self-propelled hillside harvester thresher of this invention. The steering details are shown in Figure 19 and include primarily a hydraulic cylinder 230 and a control valve 231 therefor. The hydraulic cylinder has a piston 232 and piston rod 233. The outer end of the piston rod 233 is swivelly mounted at 234 on the plate member 105a. A tie rod 235 with suitable length adjusting and swiveling means 236 joins the forwardly extending bell-crank levers 123 and 124. Thus lateral shifting of the tie rod 235 causes a steering of the wheels 107 and 108. A bracket 237 is welded at 238 and 239 to the tie rod 235. The bracket 237 has a rearward extension 240 and a forward extension 241. The hydraulic cylinder 230 has an attaching post 242 at the end opposite the piston rod 233. The attaching post 242 is hingedly fastened at 243 to the rearward extension 240 of the bracket 237. It should thus be understood that extensions or retractions of the piston rod 233 cause changes in the angular positioning of the wheels 107 and 108.

The control valve 231 for effecting actuation of the steering hydraulic cylinder 230 has a post 244 which is hingedly mounted at 245 on the forward extension 241 of the bracket 237. The other end of the control valve 231 has an actuating rod 246 for causing movement of a slide valve (not shown) within the control valve. The actuating rod 246 is slidably journaled within a swivel mounted bearing 247 on the tubular member 103. The outer end of this transversely disposed rod 246 is attached at 248 to another link rod 249 which extends back across the machine. The link rod 249 is attached at 250 to a rearwardly extending crank arm 251. The crank arm is pivoted at 252 on the main frame 96 where it is actuated for arcuate movement by means of connecting linkage designated generally as 253. The linkage 253 joins the steering control wheel 52 on the operator's platform with the crank arm 251. The fluid conduits to the control valve and thence to the hydraulic cylinder have been removed in order to make clear the mechanical construction of the device.

Hinge brackets 127 and 128 are provided on the base member 99 of the U-shaped swinging frame 96. These hinge brackets 127 and 128 are spaced apart on the U frame 96 substantially the width of the separator housing 22. By reason of the offset of the separator housing 22 within the U member 96 the hinge bracket 128 is disposed on the inclined portion 100 of the frame whereas the hinge 127 is substantially on the flat portion of the side of the base member 99. A tubular frame member 129 is disposed across the top of the separator housing 22 spaced to the rear of the tubular member 66. A longitudinally disposed torque tube 315 is fastened integrally to said cross torque tube 66 at 316 and extends rearwardly for integral fastening to the second cross torque tube 129 at 317. The top of the separator housing 22 is joined to the tubular member 129 by means of brackets or the like 130 and 131. Downwardly disposed hinge brackets 132 and 133 on the tubular member 129 are in vertical alignment with the hinge brackets 127 and 128 which extend upwardly from the U-shaped frame 96. Fluid cylinders and pistons act as the hinge connecting links 134 and 135 between the hinge brackets 132 and 127, and 133 and 128.

The extensible connecting link 134 includes a hydraulic cylinder 136 having a hinge connecting member 137 which is attached by means of a hinge pin 138 to the hinge member 132 depending from the cross torque tube 129. The connecting link 134 also includes a piston 139 and piston rod 139a which extends outwardly from the bottom of the hydraulic cylinder 136 and is joined to the hinge bracket 127 on the U member 99 by means of a hinge pin 140. Similarly the connecting link 135 is equipped with a hydraulic cylinder 141 having an upward hinge extension 142 which is joined by means of a pin 143 to the downwardly depending hinge member 133 of the torque tube 129. This connecting link 135 similarly has a piston 144 with a downwardly depending piston rod 144a which is attached to the hinge bracket 128 projecting upwardly from the portion 100 of the U frame 96 by reason of a hinge pin 145. It will thus be apparent that as the piston rods 139a and 144a are extended the U frame 96 will move downwardly about its hinge mounting 97a and 98a as shown in Figures 15, 17 and 19. This, of course, positions the dirigible wheels a greater distance beneath the separator housing 22. Conversely when the piston rods 139a and 144a are withdrawn into the cylinders 136 and 141 the steerable wheels 107 and 108 are drawn up close to the separator body 22 and thus the machine is capable of traversing an upwardly or downwardly inclined hill with the separator body 22 remaining level at all times. The U member or bail 96 is pivoted at its forward end, as previously described, and at its rear closed end it carries a complete steering mechanism as previously described which is pivotally mounted at the center of the rear of this U frame member. Therefore, looking down upon the U frame, it carries in its center the rear steering frame and is held in position by the two cylinder and piston connecting links 134 and 135 at either side of the pivoted rear steering frame. The two links 134 and 135 flank the vertical side walls of the separator body 22 and it should be noted that the separator body is offset with respect to a central positioning within the U frame 96. The wheels 107 and 108 are located centrally with respect to the drive wheels 56 and 57 and, consequently, the off centered machine requires that the size of the cylinders 134 and 135 be proportionate to the distance that the cylinders are from the pivot point 103 of the rear wheel support. This is because the cylinders come down each side of the frame and cannot easily be placed at the same distance from the pivot, in which case they would be the same size. One is roughly twice as large as the other and one is roughly twice as far from the center distance of the other giving approximately the same bending moment on the rear frame or bail.

An upright post member 146 is weldably attached at 147 on the forward end of the arm 97 of the U-shaped frame 96 as shown in Figures 10 and 19. A bracing member 148 is inclined between the upper end of the post 146 and the arm 97. The brace member is welded at 149 to the U frame arm 97 and is fixedly attached at its other end to the post 146. The upper end of the post 146 is provided with an upstanding bracket 150 to which is hingedly attached a link member 151. The link extends forwardly for hinge attachment at 152 to one arm 153 of a bell-crank lever. The bell-crank lever is fixedly attached to a transversely disposed shaft 154 which is journally carried by the bearing support 307 and an aligned bearing support 308 on the bracket member 84 on the underside of the separator housing 22. A downwardly depending arm 158 of the bell-crank lever is pivotally attached at its lower end as shown at 159 to a fore and aft disposed fluid cylinder 160. The bell-crank lever thus comprises the bell-crank arms 153 and 158. A piston rod 161 projects forwardly from the cylinder 160 and is pivotally attached at 162 to the underside and lower forward end of the feeder housing 23 of the harvesting portion of this implement. The fluid cylinder 160 is of the one way variety having a port 163 for the delivery to and exhaust of fluid from the cylinder.

For the moment let us look at the operation of the implement as to the raising and lowering of the feeder housing 23 and its associated platform 25 without reference to the hillside leveling mechanism. In this situation fluid under pressure may be admitted to the port 163, thus causing the piston 161 to be extended forwardly and the feeder housing 23 swung upwardly and forwardly. Conversely, when fluid under pressure is exhausted through the port 163 the piston is allowed to be withdrawn into the cylinder 160, thus causing the feeder housing and platform to be lowered downwardly and rearwardly.

The vertical level of the platform may thus be controlled by the operator simply by admitting or exhausting fluid under pressure from the cylinder 160. This, of course, permits the platform to be raised to a transport position and/or permits the operator to raise or lower the platform to obtain the desired level of cut of the grain. In the present machine, there is the additional factor of hillside leveling which must be tied into the raising and/or lowering of the harvester platform. Therefore, there is the linkage extending from the rear bail, or U frame, which supports the steering wheels, forward to the rockshaft 154 from which arms 158 and 158a depend down to the hydraulic cylinders 160 and 160a. The cylinders are attached, as previously described, by means of their pistons 161 and 161a engaging at 162 and 162a to the underside of the feeder housing of the harvesting portion of the implement. The platform is raised hydraulically, but the position of the arms 158 and 158a against which these raising cylinders react is controlled by the rockshaft 154 on which these arms are fastened back to the rear bail 96. This linkage is so designed that the movement of the rear bail is exactly compensated for in movement of the arms 158 and 158a against which the hydraulic cylinders lifting the platform are disposed, so that the cylinders themselves are bodily moved and the platform is adjusted to maintain uniform height thereof above the ground. Therefore, once the height of the platform is set, it is kept that same height above the ground regardless of the fore and aft leveling of the machine. This function of the implement is automatic, in that it does not require separate manual operation by the operator in order to maintain a constant height of the platform above the ground regardless of the hillside over which the implement is traveling. As a further example of the operation of the machine of this invention, let us assume we are going downhill. The cylinders at the back end 134 and 135 have their piston rods 139a and 144a retracted within the cylinders, the wheels 107 and 108 are very close to the straw delivery of the combine at the rear of the separator housing 22. The platform is, we will say, ten inches above the ground. Now the implement passes through a swell, and we start uphill. The cylinders at the back end have their piston rods pushed downwardly on the U-shaped bail 96, and the rear steering wheels 107 and 108 are depressed with relation to the combine. As the U-shaped frame is swung downwardly, the posts 146 on each side of the machine pull backwardly on the links 151. This causes the fluid cylinders 160 and 160a beneath the platform and feeder housing to be moved forwardly, thereupon lifting the platform in relation to the combine without causing an extension of the pistons 161 and 161a. Thus, the cutter bar of the platform remains at the same height, with respect to the ground going uphill, as it was when going downhill. The cylinders for raising and lowering the platform can be operated manually to raise the platform; and when the rear steering wheels of the machine are raised or lowered, the platform-lifting cylinders have their ends moved fore and aft with respect to the implement. The cylinders 160 and 160a are moved bodily rather than extending or retracting the pistons 161 and 161a with respect to the cylinders. As previously explained, the linkage connection between the rear bail wheel-supporting frame and the platform-lifting cylinders provides for the platform to automatically follow the contour of the ground, and remain a constant distance from the ground regardless of the slope of hill over which the machine is traversing. It should, of course, be understood that manual operation of the platform-lifting mechanism is accomplished by admitting fluid under pressure to the cylinders 160 and 160a, whereupon the pistons 161 and 161a are extended to cause a raising of the platform. Once set at a desired level, the platform then automatically follows the leveling of the rear steerable wheels of the implement.

The transverse leveling of the implement of this invention is accomplished by raising and lowering the large traction wheels 56 and 57. As previously described, these traction wheels are mounted on arms 58 and 59, respectively, which are hinged on the fixed rectangular frame 62. The frame 62 is mounted substantially centrally of the implement from front to rear. The device is arranged so that as one of the wheels and its integral arm moves downwardly, the other one on the other side of the machine moves upwardly in an equal and opposite amount. And, of course, the opposite is true when the arm on the other side moves down, the first one moves up. Movement of the arms is accomplished by means of hydraulic cylinders 165 and 166 disposed on opposite sides of the implement. Each of these cylinders has reciprocable pistons 165a and 166a with downwardly depending piston rods 167 and 168 which are hingedly attached at 169 and 170, respectively, on the hinged wheel-supporting arms 58 and 59. The cylinders and the conduits leading to the cylinders 165 and 166 are arranged so that fluid under pressure is delivered to the top of one cylinder, and the bottom of the cylinder on the opposite side of the implement so that the arms move in opposite directions, as previously described. Further, there is a mechanical means provided immediately adjacent to and rearwardly of the hydraulic cylinders so that there is a timing and/or a locking of the system through this mechanical means to overcome any misphasing or mistiming of the hydraulic system. The mechanical means includes upwardly extending post members 171 and 172 which are hingedly mounted on the arms 58 and 59, respectively, at 173 and 174. These upstanding post members include rack teeth 175 and 176 for engagement by pinion gears 177 and 178, respectively. These pinions are fixedly mounted on opposite ends of a shaft 179 which passes through the torque tube 66 constituting the top portion of the rectangular centrally disposed frame on which the implement is carried. The rack and pinion mechanism just described is not only the timing mechanism, but it supports the full weight of the machine on the arms 171 and 172. No weight is carried on the hydraulic cylinders 165 and 166, the only thing the hydraulic cylinders do is move the wheels 56 and 57 upwardly and/or downwardly. The racks 175 and 176 and their included posts 171 and 172 extend from their pivot points 173 and 174 on the wheel carrying arms 58 and 59 upwardly and rearwardly substantially adjacent the lifting and lowering cylinders 165 and 166. The upper ends of the racks are disposed adjacent the upper torque tube 66 of the rectangular frame which supports the entire machine. The shaft 179 on which the pinions or spur gears 177 and 178 are mounted, extends through and is rotatably journalled within the transversely disposed torque tube 66 at the top of the rectangular main frame. On one side of the machine the rack 175 faces generally forwardly, and on the other side the rack faces generally rearwardly. As best shown in Figure 17, the pinion 177 is journally carried within a pair of spaced apart plates 180 and 181. The plates 180 and 181 flank the front and rear sides of the post 171 and carry therebetween vertically spaced apart rollers 182 and 183 which are adapted to roll against the backside of the rack post 171 and thus maintain the pinion 177 in engagement with the rack 175. Similarly, the pinion 178 is journally carried within a pair of spaced apart plates 184 and 185 which likewise journally carry rollers 186 and 187 to bear against the frontside of the post 172 and thus maintain the spur gear or pinion 178 in engagement with the rack 176. The system of a rack on both sides of the implement wherein both are connected to the arms supporting the traction wheels will be in static balance if the pressures are equal and opposite, this is accomplished by having one rack on one side of the transverse shaft 179 and the other rack on the opposite side on the other side of the machine so that the torsion in the shaft balances the force necessary to hold the machine up or to hold the supporting frame for the wheels down, however you look at it. The machine is balanced through the rack and pinion on each side of the torque tube 66 exending across the top of the separator housing 22. The torque shaft 179 is disposed within the torsion tube 66 positioned at the top of the rectangular frame in which the combine is cradled. It is important to understand that the platform 25 is to be maintained parallel to the ground or parallel to the drive wheels 56 and 57 which are resting on the ground while the combine is leveled transversely. This is accomplished by a cable linkage which physically pulls the platform 25 around the turntable or circular track-mounting 55 where the platform is attached to the feeder housing 23. The feeder housing 23 is mounted on and moves parallel with the combine although it can have relative vertical angular movement with respect thereto about its hinge 24, as previously described. The lower end of the feeder housing or header has the circular track 55 on which the platform 25 is fixedly mounted. There are two cables one on each side of the implement and it is these two cables that cause the circular track 55 to be rotated. As best shown in Figure 10 one of the cable means 188 is fastened at 189 to a bracket 190 on the wheel-carrying arm 58. The bracket 190 is equipped with a series of apertures 191 through which the end of the cable 188 may be attached as at 189. Attachment of the end of the cable to one of the other apertures will affect the mechanical advantage of the cable in its lifting or pulling on the platform. On the other side of the implement an identical cable is provided and is fastened to the wheel-supporting arm 59 in the same manner as the cable 188. The cable 188 extends upwardly from the arm 58 on the drive wheel so that as the drive wheel 56 moves up and down the movement of the cable 188 is equal to the movement desired at the header ring 55. The cables on each side of the implement are carried through a loop—that is, each is brought off at a certain lever arm around the pivot from the arm supporting the drive wheel, across a pulley, down across another pulley to reverse its direction and then it is carried across a pulley such that it goes across the pivot of the feeder housing 23. As best shown in Figure 10 the cable 188 from its attachment at 189 to one of the apertures 191 and the bracket 190 passes upwardly around a pulley 192 which is journally mounted on a bracket 193 affixed to the vertical standard or frame member 64. Thereafter the cable 188 extends downwardly along the post 64 and around a pulley 194 which is journally mounted on a bracket 195 also affixed to the vertical standard 64. The cable 188 at this point reverses its direction and now moves forwardly and upwardly over a pulley 196 which is journally mounted on a post 197 at 198. Thereafter the cable 188 continues forwardly to the pulley or sheave 199 which is pivoted or rotatably journalled at 200 on the feeder housing 23. The cable then passes inwardly and upwardly over the feeder housing and more particularly over the circular track 55 to attachment with the end of a helical coil spring 201 at 202. The spring is anchored to a post 203 which extends upwardly from the platform 25. The cable on the other side of the implement is designated as numeral 204 and it should be understood that it is identical to the cable 188 and is mounted on a plurality of pulleys 192a, 194a and 196a comparable to the pulleys 192, 194 and 196 for the cable 188. As best shown in Figures 7 and 16 the cable 204 passes around a pulley 205 on the feeder housing 23 and then is anchored to a coil spring 206 which is mounted on the arm 203 adjacent the attachment of the cable 188 thereto. This particular arrangement of the cables 188 and 204 on opposite sides of the implement arranged in the manner as shown and described means that as the operator raises or lowers the platform 25 about its hinge 24 by means of extending and/or retracting the pistons 161 from the cylinders 160 the cable length does not change as will later be explained. The lever arm 203 is fastened to the ring 55 that tilts the platform. As previously stated this attachment of the cables to the ring is not directly, but is made through the springs 201 and 206 which springs are capable of being tightened as desired. Both springs are tightened up, one on each side, and the platform is controlled by the cables through the springs. There are two reasons for the springs—one is to allow a little play in the platform in the event one end of the platform should strike the ground or hits the ground through irregularity of the surface of the ground. The springs allow the platform sufficient lateral freedom to ride the ground if that is the wish of the operator. The other reason for the springs is that the platform may not be exactly balanced. The platform is roughly in balance by reason of the sickle drive being placed on one side of the implement and the reel drive on the other, but it is obvious that the platform might not be exactly balanced and thus the springs do play an important part in the device of this invention. By tightening the cable on one side a little more than the cable and spring on the other it is possible to get a realistic balance of the platform so that the platform will approximately follow the line of the wheels. It should be noticed that the pulley 196 is substantially in axial alignment with the pivot 24 of the feeder housing 23. The fact that the cables pass over the pivot axis 24 and down alongside the header 23 is important for another reason. The cables are approximately in the line of the header and both cables are under considerable tension as the springs are tightened up on both sides equally so that the cables are taut and they support the platform to a considerable degree. That is, the cables pull up right in the line of the header 23. Instead of the weight of the platform being down on the header, the header is being pulled up by the cables 188 and 204 about as much as the weight of the platform is pulling it down so that there is not a great deal of "inline" stress on the feeder conveyor from the platform itself. It will thus be seen from the description of the cables and their attachment to the platform adjusting mechanism about the annular track or ring 55 that as the traction driving wheels 56 and 57 are raised and/or lowered to accommodate the machine to any side hill or which the implement is being operated such raising and/or lowering will cause the platform to be tilted proportionately to the amount of tilt of the side wheels so that the platform operates in a position parallel to the ground or parallel to the traction wheels as previously described. Thus if one of these traction wheels on its pivot arm drops downwardly the platform simultaneously drops downwardly that same amount on that same side of the implement. Conversely if the traction wheel is raised on one side of the implement the platform is similarly raised on that side to a degree commensurate with the amount of raising of the traction wheel.

It has been shown that the implement of this invention is capable of leveling both fore and aft and transversely with respect to the line of draft of the implement. It will thus be apparent that the implement of this invention may level universally in a manner to compensate for a hillside slope in one or two directions. In other words, the implement may accommodate itself to a compound slope, wherein the hill is either up or down or side-hill. The means for accomplishing this automatic leveling has been described in part as a hydraulic system. Various portions of this system have been described in connection with the operation of the individual elements of the leveling mechanism; but in its entirety, the system has not yet been described. The following material, therefore, relates to the correlation of the several hydraulic component elements and the interengagement of these elements, one with the other, in order to complete the system; and simultaneously therewith, the description of the automatic means for actuating this system will be included. The hydraulic system of this invention is controlled by two valves 208 and 209 which are disposed generally at right angles to one another and are best shown in Figures 11 and 22. The valves are carried on the torque tube 66 by a bracket 208a which carries a vertical post 208b. The valves 208 and 209 are fastened to the post 208b by bolts 208c and 208d. Each of the valves 208 and 209 is equipped with outwardly projecting spool extensions 210 and 211. The extensions 210 and 211 project toward each other, and would if continued, intersect each other. Each of the extensions is provided at its outer end with a plate 212 and 213 respectively, which is formed integrally therewith and has elongated apertures 212a and 213a therein which cross at the intersection of the plates. A pendulum 214 is mounted on a bracket 215 which is affixed to the cross tube 66 of the central main frame 62. The attachment of the pendulum to the bracket 215 is through the means of a pendulum rod 216 which is hingedly attached at 217 to the underside of the bracket 215. The hinge 217 is relatively loose so that in effect it is a universal joint permitting the pendulum 214 to tilt or swing in any direction from a vertical position, as shown in Figure 11. The pendulum rod 216 passes directly through the crossing elongated apertures 212a and 213a in the plates 212 and 213, respectively, as shown in Figure 22. A fluid reservoir 220 is fixedly provided on the combine housing 22, and a pump 221 is adapted to deliver fluid under pressure from the tank 220 to the control valves 208 and 209. A conduit 222 joins the pump 221 with the control valve 209. A conduit 223 joins the control valves 208 and 209, thus providing for the delivery of fluid under pressure from the pump to both of the control valves. Let us now look at the operation of control valve 208. A conduit 224 has one end fastened to the valve 208 and its branches 224a and 224b respectively, extend to the top of cylinder 165 and the bottom of cylinder 166 at their respective sides of the implement; thus insuring that as one traction wheel is raised, the other is lowered. Similarly, a conduit 225, leading from the control valve 208, has a branch 225a which passes to the bottom of cylinder 165 and a branch 225b which passes to the top of cylinder 166; thereby enabling the two-way cylinders 165 and 166 to either act to extend or retract their respective pistons, and as just stated, either raise or lower the wheel-carrying arms. Either of the conduits 224 and/or 225 acts at one time to deliver fluid under pressure to the cylinders 165 and 166, and/or to exhaust fluid under pressure from these same cylinders, and thereupon deliver the fluid under pressure back to the reservoir tank 220.

In examining the control valve 209, fluid under pressure is delivered from, and through, the conduit 226 through branches 226a and 226b to the tops of the cylinders 136 and 141 respectively; and similarly, the conduit 227 through branches 227a and 227b delivers, or exhausts, fluid under pressure from the bottoms of the cylinders 136 and 141. The conduit 228 joins the control valve 208 and the reservoir fluid tank 220, thereby permitting exhaust of the fluid back to the reservoir tank; and this single conduit 228 in association with the conduit 223, joining the valves 208 and 209, permits the exhaust from both of the control valves back to the reservoir tank. Thus, the leveling of the machine is controlled by hydraulic actuation of the fore and aft leveling cylinders 136 and 141 and the side leveling cylinders 165 and 166. The valve 209, controlling the fore and aft leveling, lies substantially parallel to the length of the separator housing 22, and the valve 208, for the cross leveling, lies substantially crosswise to the separator. The valves 208 and 209 have slidable spools or rods 254 and 255, and they are operated by the pendulum rod passing through the elongated slots in the plates 212 and 213 as previously explained. Each slot is long enough so that the pendulum may swing one way without operating one of the valves; but if it swings to or from the length of either spool, that valve will be operated. In many instances both valves are operated simultaneously. These valves are very short-stroke valves. Springs 254a and 255a urge the spools back to a centered position. Very little movement of the pendulum weight 214 is required to move the spools sufficiently to operate the valves. The single driven pump 221 operates the valves 208 and 209 in series. The valves are of the tandem type and either or both may be operated depending upon the swing of the pendulum 214. The first valve 209 in the series is the fore and aft leveling valve while the second valve 208 in the series is the cross-leveling valve.

The hillside harvester thresher of this invention may thus be operated in hilly country for efficient harvesting and threshing of grain. Obviously the degree of slope of hill for which the implement may fully compensate by automatic leveling is limited by reason of the physical characteristics of the implement. However, even though the machine may have reached its limit of compensatory leveling the pendulum 214 will still be causing the control valves to deliver fluid under pressure to any or all of the hydraulic cylinders 136, 141, 165 and 166. Thus, there must be some means associated with these cylinders to cause bypassing of the fluid under pressure when the maximum limits of leveling have been reached and the implement is on a still greater slope of hill and the pendulum by its angular inclination is calling for the delivery of more fluid under pressure to these hydraulic cylinders.

As best shown in Figures 20 and 21, the upper and lower ends of the hydraulic cylinder 165 have been shown in order to disclose the bypassing means at the upper and lower ends of all of the cylinders 136, 141, 165 and 166. Figure 20 shows a cross sectional view of the upper end detail of the cylinder 165. A port 258 is adapted to receive or exhaust fluid under pressure from or to the conduit 224a such as shown in Figure 11. The piston 165a is fastened to the piston rod 167 by means of a nut 259. A check valve 260 is positioned on the under side of the piston 165a and a check valve 261 is positioned on the upper side of the piston 165a. These check valves 260 and 261 are joined through the medium of an annular chamber 262 and are arranged and constructed to engage seats 263 and 264, respectively. Springs 265 and 266 are adapted to urge the valves 260 and 261 into normally closed position. Let us assume that fluid under pressure is being admitted to the bottom of the cylinder 165 through the medium of the conduit 225a. In the position of the device as shown in Figure 20 the piston 165a has moved to its uppermost position and the check valve 261 is about to be mechanically opened by striking the under surface 267 of the stationary end block portion 268 of the cylinder 165. Inasmuch as the check valve 260 is directed downwardly the fluid within the cylinder 165 may open the valve 260 by causing it to lift from its seat 263 whereupon fluid within the cylinder gains access to the annular chamber 262 and may be exhausted through the now open check valve 261 through the port 258.

Similarly the bottom end of the cylinder 165 has a port 269 through which fluid under pressure may be admitted or exhausted from the cylinder. In the position of the device as shown in Figure 21, the piston 165a has now been moved downwardly to the bottom of the cylinder whereupon the check valve 260 is about to be mechanically opened by striking a ledge 270 on the end block 271 of the cylinder. Obviously fluid under pressure is being admitted through the port 258 and the limit of extension of the piston rod 167 has been reached. At this time the fluid under pressure within the cylinder 165 will cause the check valve 261 to open and admit fluid under pressure to the annular chamber 262 whereafter it is discharged through the now open check valve 260. These features as shown in Figures 20 and 21 are merely safety devices to prevent an overloading of the hydraulic systems in the event the machine is used on hillsides having a greater slope than the machine can compensate for. Thus when the limits of the cylinders have been reached and fluid under pressure is still being admitted thereto the check valve arrangement as shown in Figures 20 and 21 will come into operation and permit the fluid to be bypassed back to the fluid reservoir 220.

The implement of this invention has numerous hydraulically operated appliances. The operation of the leveling mechanisms in response to angular movement of the pendulum 214 has been shown in Fig. 11. The remaining hydraulic appliances, namely the hydraulic steering mechanism and the hydraulic platform lifting mechanism, are shown in detail in Figure 18. Thus the hydraulic devices on this implement have been divided into two separate systems and for ease of understanding a separate reservoir and separate pump have been shown for the system of Figure 18, although it should be understood that a common reservoir and common pump may be utilized for the systems of Figures 11 and 18. A fluid reservoir 275 has a conduit 276 carrying fluid to a driven pump 277. The pump thereupon delivers fluid under pressure through a conduit 278 to the control valve 231 whereupon fluid is delivered to either end of the steering hydraulic cylinder 230 through the conduits 279 or 280. The control valve 231 is comparable to one of the control valves 208 or 209 as shown in Figure 22. Following delivery of fluid to the cylinder 230 fluid under pressure is thereupon carried away from the control valve 231 through a conduit 281 to a valve 282. The valve 282 has an actuator 283 which is manually controlled by the operator of the implement. The operator may bypass the fluid under pressure from the conduit 281 through a conduit 284 which leads back to the fluid reservoir 275. Or, in the event the operator desires to vertically adjust the platform 21 of the implement the actuator 283 is moved whereupon fluid under pressure is delivered to a conduit 285 which has branches 286 and 287. These conduits thus deliver fluid under pressure to the platform lifting cylinders 160 and 160a which function in the manner previously described. It is thus evident that the mechanisms for steering and elevating the platform comprise a separate hydraulic system and this is now described and shown in Figure 18 of the drawings.

Generally the present case is concerned with the combined fore and aft and transverse leveling of an implement for use on hillsides. Numerous details of construction may obviously be varied throughout a wide range without departing from the principles disclosed herein. Further, certain of the details and certain phases of the operating device are the subject of copending patent applications which will later be identified. I do not propose limiting the patent granted hereon otherwise than as necessitated by the appended claims.

What is claimed is:

1. A self-propelled hillside harvester thresher comprising a supporting structure, wheel means carrying said supporting structure, said supporting structure including a centrally disposed fixed frame member, a rearwardly extending member hinged to said fixed frame member, spaced apart forwardly extending arms hinged to said fixed frame members, said wheel means including steerable wheels supporting the rearward end of the rearwardly extending member and large traction wheels mounted on the forward end of each of said hinged arms and means on said supporting structure for adjusting the hinged angular position of the rearwardly extending member and also the hinged angular positioning of each of said arms whereby the harvester thresher may be levelled fore and aft as well as transversely.

2. A device as set forth in claim 1 in which the means on said supporting structure for adjusting the angular positioning of the rearwardly extending member and the forwardly extending arms is a hydraulic means.

3. A device as set forth in claim 2 in which there is included separate control valves for effecting operation of the fore and aft and transverse levelling and a single pendulum mounted on said harvester thresher in such a manner that it hangs vertically despite inclinations over which the implement is operating, and each of said control valves mechanically joined to said pendulum whereby relative inclinations of the pendulum with respect to the harvester thresher are transmitted directly to either the control valve for the fore and aft movement or the control valve for the transverse movement or both whereby the levelling of the self-propelled hill side harvester thresher is automatically levelled regardless of the terrain over which the implement is running.

4. A self-propelled hillside harvester thresher comprising a frame structure, said frame structure including a centrally disposed substantially vertically positioned rectangular frame, a rearwardly extending bail frame member hingedly mounted at its forward open end on the bottom portion of the rectangularly shaped frame, separate arms extending forwardly and hinged at spaced points from the lower end of the vertically disposed rectangular frame, steerable wheels supporting the rear end of the bail member, relatively large traction drive wheels mounted on the forward end of each of the arms, and a thresher body carried within said vertically positioned rectangular frame.

5. A device as set forth in claim 4 in which there is means interconnected between said forwardly hinging arms arranged and constructed to permit only equal and opposite arcuate movement of the arms about their respective hinges.

6. A device as set forth in claim 5 in which the means for providing equal and opposite movement of the forwardly hinging arms comprises generally vertically extending members from each of said arms, a transversely disposed shaft journally carried in the top of said rectangular frame, pinions mounted on each end of the transversely disposed shaft, and gear racks on opposite sides of said vertically extending members engaging said pinions.

7. A device as set forth in claim 6 in which hydraulic cylinder and piston means is arranged and constructed for attachment between an upper portion of said rectangular frame and said separately hinged arms adjacent said generally vertically extending members to angularly move said arms, and further hydraulic cylinder and piston means attached to said frame structure and said bail frame member spaced from its hinge attachment to raise and/or lower the rearwardly extending bail frame member.

8. A device as set forth in claim 7 in which a control valve is provided for the fore and aft levelling and another control valve is provided for the transverse levelling, said control valves each having a spool, said spools disposed at right angles to one another, pendulum means hingedly mounted on said harvester thresher, slotted plate means fastened to each of said spools at the location of the intersection thereof, said pendulum means having a rod projecting through said intersecting slots of the plate means whereby when the pendulum means has relative swinging movement with respect to the harvester thresher by reason of the implement operating over hillsides or the like, the pendulum rod causes actuating of the control valve spools to a degree commensurate with ground conformation.

9. A self propelled harvester thresher comprising a mobile supporting structure, said mobile supporting structure including a fixed substantially centrally disposed frame part and a rearwardly extending frame part hinged to said fixed frame part, a thresher portion having its forward end mounted on said centrally disposed frame part of said mobile supporting structure, the rearward end of the thresher portion supported by the rear part of the rearwardly extending frame part, a harvester portion mounted on the forward end of said thresher portion, and extensible means between the thresher and the rearwardly extending frame part for swinging said rearwardly extending frame part about its hinge to effect fore-and-aft levelling of the thresher portion thereon.

10. A device as set forth in claim 9 in which there is included means intermediate the thresher portion and the harvester portion for vertically adjusting the harvester portion with respect to the thresher portion.

11. A device as set forth in claim 9 in which there is means intermediate the rearwardly extending frame part and the harvester portion responsive to swinging movement of the rearwardly extending frame part for vertically adjusting the harvester portion.

12. A device as set forth in claim 9 in which there is manually operable means intermediate the thresher portion and the harvester portion for vertically adjusting the harvester portion with respect to the thresher portion, and means interposed between the rearwardly extending frame part and the means intermediate the thresher portion and the harvester portion responsive to swinging movement of the rearwardly extending frame part for imposing a vertical adjustment of the harvester portion independent of the manually operable means for vertically adjusting the harvester portion.

13. A device as set forth in claim 9 in which hydraulic cylinder and piston means are disposed between the thresher portion and the harvester portion, manually operable means to hydraulically actuate said hydraulic cylinder and piston means, and linkage means joining said hydraulic cylinder and piston means with said rearwardly extending frame part whereby swinging movement of said frame part causes a bodily shifting of said hydraulic cylinder and piston means and corresponding adjusting of said harvester portion without hydraulically actuating said hydraulic cylinder and piston means.

14. A vehicle comprising a frame structure, said frame structure having a centrally disposed portion, a longitudinally disposed portion hingedly mounted on said centrally disposed portion, transversely spaced apart arms hingedly mounted on said centrally disposed portion and extending in a direction opposite the longitudinally disposed portion and arranged and constructed for separate vertical hinging movement, wheels mounted on said longitudinally disposed portion and on said spaced apart arms whereby separate arcuate adjustment of the longitudinally disposed portion and the spaced apart arms provide for universal levelling of said vehicle.

15. A device as set forth in claim 14 in which there is included means intermediate the centrally disposed portion of the frame structure and the longitudinally disposed portion and each of said transversely spaced apart arms for arcuately adjusting the longitudinally disposed portion and the spaced apart arms.

16. A device as set forth in claim 15 in which said means for adjusting includes a pendulum hung for universal movement from said centrally disposed portion, and means responsive to inclinations of said pendulum with respect to said centrally disposed portion for actuating said adjusting means.

17. A device as set forth in claim 16 in which said means responsive to inclinations of the pendulum are hydraulic means.

18. A vehicle of the type equipped to negotiate hills comprising a supporting structure, said supporting structure including a central frame part, a longitudinally extending frame part hinged to said central frame part, transversely spaced apart arms separately hinged to said central frame part and extending in a direction opposite the longitudinally extending frame part, wheels mounted on the outer ends of said longitudinally extending frame part, a traction wheel carried on each of said transversely spaced apart arms, and means disposed intermediate said central frame part and the longitudinally extending frame part and each of said transversely spaced apart arms for levelling said central frame part by arcuately adjusting said longitudinally extending frame part and said transversely spaced apart arms with respect to said central frame part.

19. A device as set forth in claim 18, in which there is included means for actuating said means levelling the central frame part.

20. A device as set forth in claim 19 in which the actuating means includes a pendulum and rod hung for universal swinging movement on said central frame part.

21. A device as set forth in claim 20 in which the levelling means includes hydraulic mechanisms.

22. A device as set forth in claim 21 in which the hydraulic mechanisms include separate hydraulic cylinders and pistons reacting against said central frame part and having piston rods adapted to engage the outer end of each of said transversely spaced apart arms for equal and opposite movement.

23. A device as set forth in claim 22 in which said hydraulic mechanisms further include a fluid reservoir and pump.

24. A device as set forth in claim 23 in which the hydraulic mechanisms further include two control valves for directing fluid from the reservoir and pump to said hydraulic cylinders and pistons.

25. A device as set forth in claim 24 in which the control valves are positioned at right angles to each other substantially in a horizontal plane, and each control valve extending generally in line with the direction of compensatory levelling it controls.

26. A device as set forth in claim 25 in which the control valves have sliding spools and actuating rods extending outwardly from the ends thereof, and said rods having plates fixed to the ends thereof, said plates disposed closely above one another and each plate having an elongated aperture therein arranged to cross each other at right angles, whereby the pendulum rod is hung through said crossed elongated apertures wherein any angular inclination of the pendulum and rod with respect to the central frame part will cause an actuation of either or both the control valves for compensatory movement of the hydraulic cylinders and pistons to effect downward or upward movement of the longitudinally extending frame part and/or the transversely spaced apart arms.

27. A harvester thresher of the type adapted to traverse hills comprising a supporting structure, said supporting structure including a central frame part, a longitudinally extending frame part hinged to said central frame part, transversely spaced apart arms separately hinged to said central frame part and extending in a direction opposite the longitudinally extending frame part, wheels mounted on the outer end of said longitudinally extending frame part, a traction wheel carried on each of said transversely spaced apart arms, a thresher portion having one end thereof fixedly mounted on said central frame part, extensible means joining the other end of the thresher portion to the longitudinally extending frame part, a harvester portion carried on said thresher portion, means hinging said harvester portion to said thresher portion for vertical swinging movement, and means raising said harvester portion with respect to said thresher portion, and said last named means operable in response to raising and/or lowering the longitudinally extending frame part with respect to the central frame part by operating said extensible means.

28. A device as set forth in claim 27 in which the means raising said harvester portion with respect to said thresher portion includes hydraulic cylinder and piston means mounted intermediate said harvester portion and said thresher portion.

29. A device as set forth in claim 28 in which the hydraulic cylinder and piston means has means for manually actuating said cylinder means for raising and/or lowering the harvester portion.

30. A device as set forth in claim 29 in which there is included linkage means joining the longitudinally extending frame part and the hydraulic cylinder and piston means whereby the hydraulic cylinder and piston means are moved in whole when the longitudinally extending frame part is raised or lowered to superimpose an automatic raising and/or lowering of the harvester portion with respect to the thresher portion over the manually actuated hydraulic cylinder and piston means.

31. A self-propelled harvester thresher comprising a supporting structure, said supporting structure including a central frame part, said central frame part being rectangular in shape and disposed generally vertically, a rearwardly extending frame part hinged to said central frame part, transversely spaced apart arms separately hinged to said central frame part and extending forwardly therefrom, wheels mounted on the rearwardly extending frame part, a traction wheel carried on each of said transversely spaced apart arms, a thresher portion mounted within said vertically disposed rectangular central frame part, and a harvester portion carried on said thresher portion.

32. A device as set forth in claim 31 in which there is included means disposed between said central frame part and said rearwardly extending frame part and said central frame part and each of said transversely spaced apart arms for leveling said central frame part by arcuately adjusting said rearwardly extending frame part and said transversely spaced apart arms.

33. A self-propelled harvester thresher comprising a supporting structure, said supporting structure including a central frame part which is rectangular in shape and generally vertically disposed, a U-shaped rearwardly extending frame part having spaced apart side arms, the forward ends of said spaced apart side arms hinged to the bottom of said central frame part, transversely spaced apart arms separately hinged to the bottom of said central frame part and extending in a forward direction opposite the rearwardly extending U-shaped frame part, wheels mounted on the rearward end of said rearwardly extending frame part, said wheels being steerable, a traction wheel carried on each of said transversely spaced apart arms, connecting means interposed between said traction wheels and their respective spaced apart arms for restricting movement of the arms to a swinging only in an equal amount and opposite direction, a thresher portion mounted within said rectangular central frame part and a harvester portion carried on said thresher portion.

34. A device as set forth in claim 33 in which there is included means hinging said harvester portion to said thresher portion for vertical swinging movement.

35. A device as set forth in claim 34 in which there is further included manually operable hydraulic cylinder and piston means positioned between said harvester portion and said thresher portion for raising said harvester portion with respect to said thresher portion.

36. A device as set forth in claim 35 in which there is included means intermediate the rearwardly extending U-shaped frame part and said hydraulic cylinder and piston means for shifting the hydraulic cylinder and piston means in response to raising and/or lowering the rearwardly extending U-shaped frame part without changing the height of the harvester portion above the ground.

37. A device as set forth in claim 36 in which said hydraulic cylinder and piston means is mounted on arcuately adjustable bell-crank arms supported on said thresher portion, and said means intermediate the rearwardly extending U-shaped frame part and said hydraulic cylinder and piston means comprising linkage joined between the U-shaped frame member and the arcuately adjustable bell-crank arms whereby vertical adjustment of the rearwardly extending frame part causes a direct shifting movement of the hydraulic cylinder means.

38. A device as set forth in claim 33 in which there is included a means levelling the central frame part, said levelling means including hydraulic cylinders and pistons mounted fixedly at their one end with respect to said central frame part and said hydraulic cylinders and pistons having piston rods adapted to engage the outer end of the rearwardly extending frame part and the outer end of each of said transversely spaced apart arms.

39. A device as set forth in claim 38 in which means is provided for delivering fluid under pressure to said hydraulic cylinders and pistons for transversely spaced apart arms for effecting concurrent extension of one piston rod and retraction of the other piston rod in an equal amount in opposite direction.

40. A device as set forth in claim 39 in which means is provided in the hydraulic cylinders and pistons for bypassing the fluid under pressure when the cylinders have their piston rods extended or retracted their maximum limits.

41. A device as set forth in claim 40 in which said bypassing means includes oppositely disposed check valves in said pistons, and means actuating said check valves.

42. A hillside harvester thresher comprising a supporting structure, said supporting structure including a central rectangularly shaped frame part, said rectangularly shaped frame part having a torque tube across the top thereof, a longitudinally extending torque tube fastened integrally to said torque tube across the top and projecting rearwardly, a second cross torque tube fastened integrally with the end of said longitudinally extending torque tube and disposed substantially parallel to the first said torque tube, a rearwardly extending frame part hinged to the bottom of said central rectangularly shaped frame part, and an elongated thresher body mounted within said rectangularly shaped frame part and fixedly mounted with respect thereto.

43. A device as set forth in claim 42 in which extensible hydraulic cylinder and piston means are positioned intermediate the second of said cross torque tubes and the rearward end of said rearwardly extending frame part.

References Cited in the file of this patent

UNITED STATES PATENTS

| | | |
|---|---|---|
| 1,135,618 | Rhodes | Apr. 13, 1915 |
| 2,076,523 | Ballack et al. | Apr. 13, 1937 |
| 2,403,325 | Armington | July 2, 1946 |
| 2,656,668 | Witzel | Oct. 27, 1953 |